US012739584B2

(12) United States Patent
Gao et al.

(10) Patent No.: US 12,739,584 B2
(45) Date of Patent: Sep. 15, 2026

(54) METHOD AND APPARATUS FOR OBTAINING A HIGHER-ORDER AMBISONICS (HOA) COEFFICIENT

(71) Applicant: Huawei Technologies Co., Ltd., Shenzhen (CN)

(72) Inventors: Yuan Gao, Beijing (CN); Shuai Liu, Beijing (CN); Bin Wang, Shenzhen (CN); Zhe Wang, Beijing (CN); Tianshu Qu, Beijing (CN); Jiahao Xu, Beijing (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 210 days.

(21) Appl. No.: 18/460,861

(22) Filed: Sep. 5, 2023

(65) Prior Publication Data

US 2023/0421978 A1 Dec. 28, 2023

Related U.S. Application Data

(63) Continuation of application No. PCT/CN2022/078823, filed on Mar. 2, 2022.

(30) Foreign Application Priority Data

Mar. 5, 2021 (CN) ......................... 202110246382.6

(51) Int. Cl.
*H04S 7/00* (2006.01)

(52) U.S. Cl.
CPC ............. *H04S 7/30* (2013.01); *H04S 2420/11* (2013.01)

(58) Field of Classification Search
CPC ................................. G06F 16/68; G06F 3/162
USPC ............................................................ 700/94
See application file for complete search history.

(56) References Cited

U.S. PATENT DOCUMENTS

| | | | | |
|---|---|---|---|---|
| 2015/0373471 | A1* | 12/2015 | Krueger | H04S 3/00 381/21 |
| 2016/0104495 | A1 | 4/2016 | Peters et al. | |
| 2017/0171682 | A1* | 6/2017 | Boehm | H04S 3/008 |
| 2019/0069110 | A1 | 2/2019 | Gorzel et al. | |
| 2020/0196081 | A1 | 6/2020 | Yoo et al. | |
| 2020/0288259 | A1* | 9/2020 | Pinto | G06F 3/167 |
| 2020/0321013 | A1* | 10/2020 | Laaksonen | H04S 3/02 |
| 2021/0295855 | A1* | 9/2021 | Vasilache | G10L 19/008 |

(Continued)

FOREIGN PATENT DOCUMENTS

| | | | |
|---|---|---|---|
| CN | 107820166 | A | 3/2018 |
| JP | 2017523457 | A | 8/2017 |
| KR | 20190077120 | A | 7/2019 |

*Primary Examiner* — Alexander Krzystan
(74) *Attorney, Agent, or Firm* — Conley Rose, P.C.

(57) ABSTRACT

A method for obtaining a higher-order ambisonics (HOA) coefficient includes obtaining location information of a virtual speaker on a preset spherical surface, where the preset spherical surface includes M circles of longitude and N circles of latitude, and obtaining, based on the location information and a preset reference trigonometric function table, a trigonometric function value corresponding to the location information, where the reference trigonometric function table includes an elevation trigonometric function table and/or an azimuth trigonometric function table, and obtaining an HOA coefficient for the virtual speaker based on the trigonometric function value corresponding to the location information.

20 Claims, 4 Drawing Sheets

(56) References Cited

U.S. PATENT DOCUMENTS

| | | | | |
|---|---|---|---|---|
| 2022/0256302 | A1* | 8/2022 | Lecomte | H04R 3/005 |
| 2022/0358937 | A1* | 11/2022 | Mahe | H04S 7/30 |
| 2022/0386056 | A1* | 12/2022 | Vasilache | H04S 3/008 |
| 2023/0421978 | A1* | 12/2023 | Gao | H04S 7/30 |
| 2024/0071394 | A1* | 2/2024 | Laaksonen | H04S 7/303 |
| 2025/0029620 | A1* | 1/2025 | Vasilache | G10L 19/008 |

* cited by examiner

METHOD AND APPARATUS FOR OBTAINING A HIGHER-ORDER AMBISONICS (HOA) COEFFICIENT

CROSS-REFERENCE TO RELATED APPLICATIONS

This is a continuation of International Patent Application No. PCT/CN2022/078823 filed on Mar. 2, 2022, which claims priority to Chinese Patent Application No. 202110246382.6 filed on Mar. 5, 2021. The disclosures of the aforementioned applications are hereby incorporated by reference in their entireties.

TECHNICAL FIELD

This disclosure relates to audio processing technologies, and in particular, to a method and an apparatus for obtaining a higher-order ambisonics (HOA) coefficient.

BACKGROUND

A three-dimensional (3D) audio technology is an audio technology for obtaining, processing, transmitting, rendering, and replaying sound events and 3D sound field information in the real world through a computer, signal processing, or the like. The 3D audio technology enables sound to have a strong sense of space, envelopment, and immersion, and provides people with "immersive" auditory experience. A mainstream 3D audio technology is an HOA technology. The HOA technology has the following features: Recording and encoding are irrelevant to a speaker layout in a replay stage, and data in an HOA format is rotatable. Therefore, the HOA technology has higher flexibility in 3D audio replay, and therefore has gained more extensive attention and research.

In the HOA technology, an HOA signal is converted into an actual speaker signal for replay, or an HOA signal is converted into a virtual speaker signal, and then the virtual speaker signal is mapped to a binaural signal for replay. In the foregoing process, calculation of an HOA coefficient is a key step. In the technology, an HOA coefficient is calculated based on a P-order spherical harmonic expansion formula.

However, in the foregoing method, an amount of calculation is large, and a requirement for storage space is high.

SUMMARY

This disclosure provides a method and an apparatus for obtaining an HOA coefficient, to reduce an amount of calculation in a preliminary stage and save storage space.

According to a first aspect, this disclosure provides a method for obtaining an HOA coefficient, including obtaining location information of a virtual speaker on a preset spherical surface, where the location information includes elevation information and/or azimuth information, the preset spherical surface includes M circles of longitude and N circles of latitude, an intersection between the circle of longitude and the circle of latitude is referred to as a reference point, N reference points located on one circle of longitude are arranged at equal spacings, and M reference points located on one circle of latitude are arranged at equal spacings, obtaining, based on the location information and a preset reference trigonometric function table, a trigonometric function value corresponding to the location information, where the reference trigonometric function table includes an elevation trigonometric function table and/or an azimuth trigonometric function table, the elevation trigonometric function table includes a plurality of trigonometric function values corresponding to elevation information of a plurality of first reference points, the plurality of first reference points are reference points on a first circle of longitude, a quantity of the plurality of first reference points is not less than $\lfloor N/4 \rfloor+1$, $\lfloor\ \rfloor$ indicates rounding down, the first circle of longitude is one of the M circles of longitude, the azimuth trigonometric function table includes a plurality of trigonometric function values corresponding to azimuth information of a plurality of second reference points, the plurality of second reference points are reference points on a first circle of latitude, a quantity of the plurality of second reference points is not less than $\lfloor M/4 \rfloor+1$, and the first circle of latitude is one of the N circles of latitude, and obtaining an HOA coefficient for the virtual speaker based on the trigonometric function value corresponding to the location information.

In this disclosure, only trigonometric function values (an elevation trigonometric function table) of a quarter of all reference points on a circle of longitude on the preset spherical surface and/or trigonometric function values (an azimuth trigonometric function table) of a quarter of all reference points on a circle of latitude on the preset spherical surface need to be pre-obtained, and trigonometric function values at any angles ranging from 0 degrees (°) to 360° may be obtained based on the trigonometric function table. In this way, an amount of calculation in a preliminary stage can be reduced. In addition, because a quantity of angles in the trigonometric function table is reduced, an amount of data, that needs to be stored, of the trigonometric function table is also correspondingly reduced, so that storage space can be saved.

The preset spherical surface includes the M circles of longitude and the N circles of latitude, the intersection between the circle of longitude and the circle of latitude is referred to as the reference point, N reference points located on one circle of longitude are arranged at equal spacings, and M reference points located on one circle of latitude are arranged at equal spacings. To ensure that the reference points can cover all virtual speakers as much as possible, the following condition may be met: $M \times N \geq K$, where K is a total quantity of virtual speakers. For example, a value of K may be 2048, 1024, or 530. In this disclosure, because azimuth information between every two adjacent circles of longitude is equal, that is, the M circles of longitude are evenly distributed on the spherical surface, N reference points located on one circle of longitude are arranged at equal spacings, and because elevation information between every two adjacent circles of latitude is equal, that is, the N circles of latitude are evenly distributed on the spherical surface, M reference points located on one circle of latitude are arranged at equal spacings. Correspondingly, because M reference points located on one circle of latitude are arranged at equal spacings, elevation information differences between every two adjacent reference points located on one circle of latitude are equal, and because N reference points located on one circle of longitude are arranged at equal spacings, azimuth information differences between every two adjacent reference points located on one circle of longitude are equal.

The virtual speaker may be any virtual speaker disposed for sound rendering. The location information of the virtual speaker on the spherical surface includes elevation information and/or azimuth information. An included angle between a horizontal plane (for example, a plane on which the equator is located) and a connection line between a location of the virtual speaker and a center of the earth is the elevation information (or information about the angle made with the horizon) of the location information of the virtual speaker, and an included angle between a specified initial direction and a projection, on the horizontal plane, of the connection line between the location of the virtual speaker and the center of the earth is the azimuth information of the location information of the virtual speaker. Optionally, the azimuth information in this disclosure may also be referred to as an azimuth.

The reference trigonometric function table includes the elevation trigonometric function table and/or the azimuth trigonometric function table.

The elevation trigonometric function table includes the plurality of trigonometric function values corresponding to the elevation information of the plurality of first reference points. The plurality of first reference points are reference points on the first circle of longitude. The quantity of the plurality of first reference points is not less than $\lfloor N/4 \rfloor+1$, where $\lfloor\ \rfloor$ indicates rounding down. The first circle of longitude is one of the M circles of longitude.

In this disclosure, any one of the M circles of longitude is selected as the first circle of longitude, and reference points (namely, the plurality of first reference points) used for calculating the elevation trigonometric function table are selected from the N reference points on the first circle of longitude. According to a principle of a trigonometric function, an angle range of 0° (0) to 360° (2π) may be divided into four sub-ranges: 0° (0) to 90° (π/2), 90° (π/2) to 180° (π), 180° (π) to 270° (3π/2), and 270° (3π/2) to 360° (2π). A trigonometric function value calculated by using any one of the four sub-ranges may be extended to a trigonometric function value within the angle range of 0° (0) to 360° (2π). Therefore, in this disclosure, during selection of the plurality of first reference points, the quantity of the plurality of first reference points is not less than $\lfloor N/4 \rfloor+1$. To be specific, at least a quarter of the N reference points on the first circle of longitude are selected as the plurality of first reference points.

Optionally, the elevation information of the plurality of first reference points may belong to one of the four sub-ranges. For example, the elevation information of the plurality of first reference points is within the sub-range of 0° (0) to 90° (π/2), or the elevation information of the plurality of first reference points is within the sub-range of 90° (π/2) to 180° (π), or the elevation information of the plurality of first reference points is within the sub-range of 180° (π) to 270° (3π/2), or the elevation information of the plurality of first reference points is within the sub-range of 270° (3π/2) to 360° (2π).

Optionally, the elevation information of the plurality of first reference points may belong to at least two of the four sub-ranges. For example, elevation information of a first part of the plurality of first reference points is within the sub-range of 0° (0) to 90° (π/2), and elevation information of a second part of reference points is within the sub-range of 90° (π/2) to 180° (π), where the elevation information of the two parts of reference points does not overlap during calculation of a trigonometric function value, or elevation information of a part of the plurality of first reference points is within the sub-range of 90° (π/2) to 180° (π), and elevation information of another part of reference points is within the sub-range of 180° (π) to 270° (3π/2), where the elevation information of the two parts of reference points does not overlap during calculation of a trigonometric function value, or elevation information of a part of the plurality of first reference points is within the sub-range of 180° (π) to 270° (3π/2), and elevation information of another part of reference points is within the sub-range of 270° (3π/2) to 360° (2π), where the elevation information of the two parts of reference points does not overlap during calculation of a trigonometric function value, or elevation information of a first part of the plurality of first reference points is within the sub-range of 0° (0) to 90° (π/2), elevation information of a second part of reference points is within the sub-range of 90° (π/2) to 180° (π), and elevation information of a third part of reference points is within the sub-range of 180° (π) to 270° (3π/2), where the elevation information of the three parts of reference points does not overlap during calculation of a trigonometric function value, or elevation information of a first part of the plurality of first reference points is within the sub-range of 90° (π/2) to 180° (π), elevation information of a second part of reference points is within the sub-range of 180° (π) to 270° (3π/2), and elevation information of a third part of reference points is within the sub-range of 270° (3π/2) to 360° (2π), where the elevation information of the three parts of reference points does not overlap during calculation of a trigonometric function value, or elevation information of a first part of the plurality of first reference points is within the sub-range of 0° (0) to 90° (π/2), elevation information of a second part of reference points is within the sub-range of 90° (π/2) to 180° (π), elevation information of a third part of reference points is within the sub-range of 180° (π) to 270° (3π/2), and elevation information of a fourth part of reference points is within the sub-range of 270° (3π/2) to 360° (2π), where the elevation information of the four parts of reference points does not overlap during calculation of a trigonometric function value.

The not overlapping may mean that trigonometric function values calculated by using elevation information belonging to different sub-ranges are not equal. For example, there are a total of four first reference points (n1, n2, n3, and n4), where elevation information of n1 is 0, elevation information of n2 is π/6, elevation information of n3 is π/3, and elevation information of n4 is π/2, or elevation information of n1 is 0, elevation information of n2 is 2/3π, elevation information of n3 is 4/3π, and elevation information of n4 is 2π. It should be noted that, in this disclosure, a sub-range to which the elevation information of the plurality of first reference points belongs is not limited, provided that the trigonometric function values of the elevation information of the plurality of first reference points can cover trigonometric function values at all angles within one of the sub-ranges.

Correspondingly, a value range of the elevation information of the location information is 0 to 2π.

In this disclosure, the plurality of trigonometric function values corresponding to the elevation information of the plurality of first reference points may be sine function values or cosine function values.

Optionally, a sine function value corresponding to elevation information of an $i^{th}$ first reference point meets the following formula (1):

$$\text{sin\_table\_N}(i) = \sin\left(\frac{\pi r_i}{2N'} \times i\right), \tag{1}$$

where i=0, 1, . . . , and N', $N'=\lfloor N/4 \rfloor$, and $r_i$ indicates a radius of the first circle of longitude.

Optionally, a cosine function value corresponding to elevation information of an $i^{th}$ first reference point meets the following formula (2):

$$\text{cos\_table\_N}(i) = \cos\left(\frac{\pi r_i}{2N'} \times i\right), \tag{2}$$

where i=0, 1, . . . , and N', $N'=\lfloor N/4 \rfloor$, and $r_i$ indicates a radius of the first circle of longitude.

The azimuth trigonometric function table includes the plurality of trigonometric function values corresponding to the azimuth information of the plurality of second reference points. The plurality of second reference points are reference points on the first circle of latitude. The quantity of the plurality of second reference points is not less than $\lfloor M/4 \rfloor+1$, where $\lfloor\ \rfloor$ indicates rounding down. The first circle of latitude is one of the N circles of latitude.

In this disclosure, any one of the N circles of latitude is selected as the first circle of latitude, and reference points (namely, the plurality of second reference points) used for calculating the azimuth trigonometric function table are selected from the M reference points on the first circle of latitude. Similarly, according to a principle of a trigonometric function, an angle range of 0° (0) to 360° (2π) may be divided into four sub-ranges: 0° (0) to 90° (π/2), 90° (π/2) to 180° (π), 180° (π) to 270° (3π/2), and 270° (3π/2) to 360° (2π). A trigonometric function value calculated by using any one of the four sub-ranges may be extended to a trigonometric function value within the angle range of 0° (0) to 360° (2π). Therefore, in this disclosure, during selection of the plurality of second reference points, the quantity of the plurality of second reference points is not less than $\lfloor M/4 \rfloor+1$. To be specific, at least a quarter of the M reference points on the first circle of latitude are selected as the plurality of second reference points.

Optionally, the azimuth information of the plurality of second reference points may belong to one of the four sub-ranges. For example, the azimuth information of the plurality of second reference points is within the sub-range of 0° (0) to 90° (π/2), or the azimuth information of the plurality of second reference points is within the sub-range of 90° (π/2) to 180° (π), or the azimuth information of the plurality of second reference points is within the sub-range of 180° (π) to 270° (3π/2), or the azimuth information of the plurality of second reference points is within the sub-range of 270° (3π/2) to 360° (2π).

Optionally, the azimuth information of the plurality of second reference points may belong to at least two of the four sub-ranges. For example, azimuth information of a first part of the plurality of second reference points is within the sub-range of 0° (0) to 90° (π/2), and azimuth information of a second part of reference points is within the sub-range of 90° (π/2) to 180° (π), where the azimuth information of the two parts of reference points does not overlap during calculation of a trigonometric function value, or azimuth information of a first part of the plurality of second reference points is within the sub-range of 90° (π/2) to 180° (π), and azimuth information of a second part of reference points is within the sub-range of 180° (π) to 270° (3π/2), where the azimuth information of the two parts of reference points does not overlap during calculation of a trigonometric function value, or azimuth information of a first part of the plurality of second reference points is within the sub-range of 180° (π) to 270° (3π/2), and azimuth information of a second part of reference points is within the sub-range of 270° (3π/2) to 360° (2π), where the azimuth information of the two parts of reference points does not overlap during calculation of a trigonometric function value, or azimuth information of a first part of the plurality of second reference points is within the sub-range of 0° (0) to 90° (π/2), azimuth information of a second part of reference points is within the sub-range of 90° (π/2) to 180° (π), and azimuth information of a third part of reference points is within the sub-range of 180° (π) to 270° (3π/2), where the azimuth information of the three parts of reference points does not overlap during calculation of a trigonometric function value, or azimuth information of a first part of the plurality of second reference points is within the sub-range of 90° (π/2) to 180° (π), azimuth information of a second part of reference points is within the sub-range of 180° (π) to 270° (3π/2), and azimuth information of a third part of reference points is within the sub-range of 270° (3π/2) to 360° (2π), where the azimuth information of the three parts of reference points does not overlap during calculation of a trigonometric function value, or azimuth information of a first part of the plurality of second reference points is within the sub-range of 0° (0) to 90° (π/2), azimuth information of a second part of reference points is within the sub-range of 90° (π/2) to 180° (π), azimuth information of a third part of reference points is within the sub-range of 180° (π) to 270° (3π/2), and azimuth information of a fourth part of reference points is within the sub-range of 270° (3π/2) to 360° (2π), where the azimuth information of the four parts of reference points does not overlap during calculation of a trigonometric function value.

The not overlapping may mean that trigonometric function values calculated by using azimuth information belonging to different sub-ranges are not equal. For example, there are a total of four second reference points (n1, n2, n3, and n4), where azimuth information of n1 is 0, azimuth information of n2 is π/6, azimuth information of n3 is π/3, and azimuth information of n4 is π/2, or azimuth information of n1 is 0, azimuth information of n2 is 2/3π, azimuth information of n3 is 4/3π, and azimuth information of n4 is 2π. It should be noted that, in this disclosure, a sub-range to which the azimuth information of the plurality of second reference points belongs is not limited, provided that the trigonometric function values of the azimuth information of the plurality of second reference points can cover trigonometric function values at all angles within one of the sub-ranges.

Correspondingly, a value range of the azimuth information of the location information is 0 to 2π.

In this disclosure, the plurality of trigonometric function values corresponding to the azimuth information of the plurality of second reference points may be sine function values or cosine function values.

Optionally, a sine function value corresponding to azimuth information of an $i^{th}$ second reference point meets the following formula (3):

$$\text{sin\_table\_M}(j) = \sin\left(\frac{\pi r_j}{2M'} \times j\right), \tag{3}$$

where j=0, 1, . . . , and M', $M'=\lfloor M/4 \rfloor$, and $r_j$ indicates a radius of the first circle of latitude.

Optionally, a cosine function value corresponding to azimuth information of an $i^{th}$ second reference point meets the following formula (4):

$$\text{cos\_table\_M}(j) = \cos\left(\frac{\pi r_j}{2M'} \times j\right), \tag{4}$$

where j=0, 1, . . . , and M', M'=⌊M/4⌋, and $r_j$ indicates a radius of the first circle of latitude.

It should be noted that the elevation trigonometric function table and the azimuth trigonometric function table may be calculated and stored in advance, or may be calculated and stored in real time based on values of M and N. Optionally, because both an encoder and a decoder perform framing, during calculation of the HOA coefficient, when a value of M of a current audio frame is equal to a value of M of a previous audio frame, an azimuth trigonometric function table may not need to be recalculated during processing of the current frame, and an azimuth trigonometric function table of the previous audio frame may be directly used, and when a value of N of the current audio frame is equal to a value of N of the previous audio frame, an elevation trigonometric function table may not need to be recalculated during processing of the current frame, and an elevation trigonometric function table of the previous audio frame may be directly used.

In this disclosure, a trigonometric function value corresponding to the elevation information of the location information of the virtual speaker on the preset spherical surface may be obtained based on the elevation information of the location information and the elevation trigonometric function table, and/or a trigonometric function value corresponding to the azimuth information of the location information of the virtual speaker on the preset spherical surface may be obtained based on the azimuth information of the location information and the azimuth trigonometric function table.

It can be learned that, for the location information of the virtual speaker on the preset spherical surface, the trigonometric function value corresponding to the location information may be obtained based on specific content included in the location information and specific content of the preset reference trigonometric function table. To be specific, the location information includes the elevation information, and the trigonometric function value corresponding to the elevation information of the location information may be obtained based on the elevation information and the reference trigonometric function table (if the elevation trigonometric function table exists, the elevation trigonometric function table is used, or if no elevation trigonometric function table exists, the azimuth trigonometric function table is used), and the location information includes the azimuth information, and the trigonometric function value corresponding to the azimuth information of the location information may be obtained based on the azimuth information and the reference trigonometric function table (if the azimuth trigonometric function table exists, the azimuth trigonometric function table is used, or if no azimuth trigonometric function table exists, the elevation trigonometric function table is used).

In this disclosure, the trigonometric function value corresponding to the elevation information of the location information may be obtained by using the following several methods.

1. When the elevation information of the location information is equal to elevation information of a reference point of the plurality of first reference points, a trigonometric function value that is in the elevation trigonometric function table and that corresponds to the elevation information of the reference point is used as the trigonometric function value corresponding to the elevation information of the location information.

That the elevation information of the location information is equal to elevation information of a reference point of the plurality of first reference points indicates that elevation information corresponding to a location of the virtual speaker on the preset spherical surface is exactly equal to an angle in the elevation trigonometric function table, to be specific, the location of the virtual speaker on the preset spherical surface coincides with a location of a reference point selected for obtaining the elevation trigonometric function table. Therefore, the trigonometric function value of the elevation information may be directly queried from the elevation trigonometric function table.

2. When the elevation information of the location information is equal to elevation information of a reference point of N reference points other than the plurality of first reference points, the elevation information of the location information is converted into elevation information of a reference point of the plurality of first reference points, and a trigonometric function value that is in the elevation trigonometric function table and that corresponds to the elevation information of the reference point is used as the trigonometric function value corresponding to the elevation information of the location information.

That the elevation information of the location information is equal to elevation information of a reference point of N reference points other than the plurality of first reference points indicates that elevation information corresponding to a location of the virtual speaker on the preset spherical surface does not belong to an angle in the elevation trigonometric function table, and is equal to elevation information of another reference point on the first circle of longitude, to be specific, the location of the virtual speaker on the preset spherical surface coincides with a location of a reference point, where the reference point is not used for obtaining the elevation trigonometric function table, but elevation information of the reference point has a trigonometric function correspondence with an angle in the trigonometric function table. Therefore, the elevation information of the location information may be converted into elevation information of a reference point of the plurality of first reference points according to a principle of a trigonometric function, and then a trigonometric function value corresponding to the elevation information of the reference point of the plurality of first reference points is obtained through table lookup, and the trigonometric function value corresponding to the elevation information of the reference point of the plurality of first reference points is used as the trigonometric function value corresponding to the elevation information of the location information.

3. When the elevation information of the location information is not equal to elevation information of any reference point, elevation information of a reference point corresponding to the location information is obtained based on the elevation information of the location information. When the elevation information of the reference point corresponding to the location information is equal to elevation information of a reference point of the plurality of first reference points, a trigonometric function value that is in the elevation trigonometric function table and that corresponds to the elevation information of the reference point is used as the trigonometric function value corresponding to the elevation information of the location information. When the elevation information of the reference point corresponding to the location information is equal to elevation information of a reference point of N reference points other than the plurality of first reference points, the elevation information of the reference point corresponding to the location information is converted into elevation information of a reference point of the plurality of first reference points, and a trigonometric function value that is in the elevation trigonometric function table and that corresponds to the elevation information of the reference point is used as the trigonometric function value corresponding to the elevation information of the location information.

That the elevation information of the location information is not equal to elevation information of any reference point indicates that a location of the virtual speaker on the preset spherical surface is neither on a circle of longitude nor on a circle of latitude. Therefore, the elevation information of the reference point corresponding to the location information is first obtained, and then the trigonometric function value corresponding to the elevation information of the reference point is obtained according to the method 1 or the method 2, and the trigonometric function value corresponding to the elevation information of the reference point is used as the trigonometric function value corresponding to the elevation information of the location information.

Optionally, the location information may be represented by using an index, and the index may include an elevation index and an azimuth index. For example, on any circle of latitude, an azimuth of a reference point that is not distributed on the circle of latitude is set to 0, and then a corresponding azimuth index is obtained through conversion based on a preset conversion formula between an azimuth and an azimuth index. Because azimuth differences between any adjacent reference points on the circle of latitude are equal, azimuths of other reference points on the circle of latitude may be obtained, and azimuth indexes of the other reference points are obtained based on the conversion formula. It should be noted that a specific reference point, on the circle of latitude, whose azimuth is set to 0 is not limited in this disclosure. Similarly, because elevation differences between adjacent reference points along a direction of a circle of longitude meets the foregoing requirement, after a reference point whose elevation is 0 is set, elevations of other reference points may be obtained, and elevation indexes of all reference points on the circle of longitude may be obtained based on a preset conversion formula between an elevation and an elevation index. It should be noted that a specific reference point, on the circle of longitude, whose elevation is set to 0 is not limited in this disclosure. For example, the reference point may be a reference point on the equator, a reference point at the south pole, or a reference point at the north pole.

Optionally, the elevation φ and the index φ' of the elevation information meet the following formula (5) (to be specific, a conversion formula between an elevation and an elevation index):

$$\varphi' = \text{round}\left(\frac{\varphi}{2\pi r_i \times N}\right), \tag{5}$$

where $r_i$ indicates a radius of the first circle of longitude, and round( ) indicates rounding.

In this disclosure, the trigonometric function value corresponding to the azimuth information of the location information may be obtained by using the following several methods.

1. When the azimuth information of the location information is equal to azimuth information of a reference point of the plurality of second reference points, a trigonometric function value that is in the azimuth trigonometric function table and that corresponds to the azimuth information of the reference point is used as the trigonometric function value corresponding to the azimuth information of the location information.

That the azimuth information of the location information is equal to azimuth information of a reference point of the plurality of second reference points indicates that azimuth information corresponding to a location of the virtual speaker on the preset spherical surface is exactly equal to an angle in the azimuth trigonometric function table, to be specific, the location of the virtual speaker on the preset spherical surface coincides with a location of a reference point selected for obtaining the azimuth trigonometric function table. Therefore, the trigonometric function value of the azimuth information may be directly queried from the azimuth trigonometric function table.

2. When the azimuth information of the location information is equal to azimuth information of a reference point of M reference points other than the plurality of second reference points, the azimuth information of the location information is converted into azimuth information of a reference point of the plurality of second reference points, and a trigonometric function value that is in the azimuth trigonometric function table and that corresponds to the azimuth information of the reference point is used as the trigonometric function value corresponding to the azimuth information of the location information.

That the azimuth information of the location information is equal to azimuth information of a reference point of M reference points other than the plurality of second reference points indicates that azimuth information corresponding to a location of the virtual speaker on the preset spherical surface does not belong to an angle in the azimuth trigonometric function table, and is equal to azimuth information of another reference point on the first circle of longitude, to be specific, the location of the virtual speaker on the preset spherical surface coincides with a location of a reference point, where the reference point is not used for obtaining the azimuth trigonometric function table, but azimuth information of the reference point has a trigonometric function correspondence with an angle in the trigonometric function table. Therefore, the azimuth information of the location information may be converted into azimuth information of a reference point of the plurality of second reference points according to a principle of a trigonometric function, and then a trigonometric function value corresponding to the azimuth information of the reference point of the plurality of second reference points is obtained through table lookup, and the trigonometric function value corresponding to the azimuth information of the reference point of the plurality of second reference points is used as the trigonometric function value corresponding to the azimuth information of the location information.

3. When the azimuth information of the location information is not equal to azimuth information of any reference point, azimuth information of a reference point corresponding to the location information is obtained based on the azimuth information of the location information. When the azimuth information of the reference point corresponding to the location information is equal to azimuth information of a reference point of the plurality of second reference points, a trigonometric function value that is in the azimuth trigonometric function table and that corresponds to the azimuth information of the reference point is used as the trigonometric function value corresponding to the azimuth information of the location information. When the azimuth information of the reference point corresponding to the location information is equal to azimuth information of a reference point of M reference points other than the plurality of second reference points, the azimuth information of the reference point corresponding to the location information is converted into azimuth information of a reference point of the plurality of second reference points, and a trigonometric function value that is in the azimuth trigonometric function table and that corresponds to the azimuth information of the reference point is used as the trigonometric function value corresponding to the azimuth information of the location information.

That the azimuth information of the location information is not equal to azimuth information of any reference point indicates that a location of the virtual speaker on the preset spherical surface is neither on a circle of longitude nor on a circle of latitude. Therefore, the azimuth information of the reference point corresponding to the location information is first obtained, and then the trigonometric function value corresponding to the azimuth information of the reference point is obtained according to the method 1 or the method 2, and the trigonometric function value corresponding to the azimuth information of the reference point is used as the trigonometric function value corresponding to the azimuth information of the location information.

Optionally, the azimuth θ and the index θ' of the azimuth information meet the following formula (6) (to be specific, a conversion formula between an azimuth and an azimuth index):

$$\theta' = \text{round}\left(\frac{\theta}{2\pi r_j \times M}\right), \tag{6}$$

where $r_j$ indicates a radius of the first circle of latitude, and round( ) indicates rounding.

In this disclosure, only trigonometric function values (an elevation trigonometric function table) of a quarter of all reference points on a circle of longitude on the preset spherical surface and/or trigonometric function values (an azimuth trigonometric function table) of a quarter of all reference points on a circle of latitude on the preset spherical surface need to be pre-obtained, and trigonometric function values at any angles ranging from 0° to 360° may be obtained based on the trigonometric function table. In this way, an amount of calculation in a preliminary stage can be reduced. In addition, because a quantity of angles in the trigonometric function table is reduced, an amount of data, that needs to be stored, of the trigonometric function table is also correspondingly reduced, so that storage space can be saved.

According to a second aspect, this disclosure provides an apparatus for obtaining an HOA coefficient, including an obtaining module configured to obtain location information of a virtual speaker on a preset spherical surface, where the location information includes elevation information and/or azimuth information, the preset spherical surface includes M circles of longitude and N circles of latitude, an intersection between the circle of longitude and the circle of latitude is referred to as a reference point, N reference points located on one circle of longitude are arranged at equal spacings, and M reference points located on one circle of latitude are arranged at equal spacings, and a calculation module configured to obtain, based on the location information and a preset reference trigonometric function table, a trigonometric function value corresponding to the location information, where the reference trigonometric function table includes an elevation trigonometric function table and/or an azimuth trigonometric function table, the elevation trigonometric function table includes a plurality of trigonometric function values corresponding to elevation indexes of a plurality of first reference points, the plurality of first reference points are reference points on a first circle of longitude, a quantity of the plurality of first reference points is not less than $\lfloor N/4 \rfloor+1$, $\lfloor\ \rfloor$ indicates rounding down, the first circle of longitude is one of the M circles of longitude, the azimuth trigonometric function table includes a plurality of trigonometric function values corresponding to azimuth indexes of a plurality of second reference points, the plurality of second reference points are reference points on a first circle of latitude, a quantity of the plurality of second reference points is not less than $\lfloor M/4 \rfloor+1$, and the first circle of latitude is one of the N circles of latitude, and obtain an HOA coefficient for the virtual speaker based on the trigonometric function value corresponding to the location information.

In a possible implementation, the calculation module is configured to obtain, based on the elevation information of the location information and the elevation trigonometric function table, a trigonometric function value corresponding to the elevation information of the location information, and/or obtain, based on the azimuth information of the location information and the azimuth trigonometric function table, a trigonometric function value corresponding to the azimuth information of the location information.

In a possible implementation, the calculation module is configured to, when the elevation information of the location information corresponds to an elevation index of a reference point of the plurality of first reference points, use, as the trigonometric function value corresponding to the elevation information of the location information, a trigonometric function value that is in the elevation trigonometric function table and that corresponds to the elevation index of the reference point, or when the elevation information of the location information corresponds to an elevation index of a reference point of N reference points other than the plurality of first reference points, convert the elevation index of the reference point of the N reference points other than the plurality of first reference points into an elevation index of a reference point of the plurality of first reference points, and use, as the trigonometric function value corresponding to the elevation information of the location information, a trigonometric function value that is in the elevation trigonometric function table and that corresponds to the elevation index of the reference point, or when the elevation information of the location information does not correspond to an elevation index of any reference point, obtain, based on the elevation information of the location information, elevation information of a reference point corresponding to the elevation information of the location information, and when the elevation information of the reference point corresponding to the elevation information of the location information corresponds to an elevation index of a reference point of the plurality of first reference points, use, as the trigonometric function value corresponding to the elevation information of the location information, a trigonometric function value that is in the elevation trigonometric function table and that corresponds to the elevation index of the reference point, or when the elevation information of the reference point corresponding to the elevation information of the location information corresponds to an elevation index of a reference point of N reference points other than the plurality of first reference points, convert the elevation index of the reference point of the N reference points other than the plurality of first reference points into an elevation index of a reference point of the plurality of first reference points, and use, as the trigonometric function value corresponding to the elevation information of the location information, a trigonometric function value that is in the elevation trigonometric function table and that corresponds to the elevation index of the reference point.

In a possible implementation, the calculation module is configured to, when the azimuth information of the location information corresponds to an azimuth index of a reference point of the plurality of second reference points, use, as the trigonometric function value corresponding to the azimuth information of the location information, a trigonometric function value that is in the azimuth trigonometric function table and that corresponds to the azimuth index of the reference point, or when the azimuth information of the location information corresponds to an azimuth index of a reference point of M reference points other than the plurality of second reference points, convert the azimuth index of the reference point of the M reference points other than the plurality of second reference points into an azimuth index of a reference point of the plurality of second reference points, and use, as the trigonometric function value corresponding to the azimuth information of the location information, a trigonometric function value that is in the azimuth trigonometric function table and that corresponds to the azimuth index of the reference point, or when the azimuth information of the location information does not correspond to an azimuth index of any reference point, obtain, based on the azimuth information of the location information, azimuth information of a reference point corresponding to the azimuth information of the location information, and when the azimuth information of the reference point corresponding to the azimuth information of the location information corresponds to an azimuth index of a reference point of the plurality of second reference points, use, as the trigonometric function value corresponding to the azimuth information of the location information, a trigonometric function value that is in the azimuth trigonometric function table and that corresponds to the azimuth index of the reference point, or when the azimuth information of the reference point corresponding to the azimuth information of the location information corresponds to an azimuth index of a reference point of M reference points other than the plurality of second reference points, convert the azimuth index of the reference point of the M reference points other than the plurality of second reference points into an azimuth index of a reference point of the plurality of second reference points, and use, as the trigonometric function value corresponding to the azimuth information of the location information, a trigonometric function value that is in the azimuth trigonometric function table and that corresponds to the azimuth index of the reference point.

In a possible implementation, the elevation information of the location information includes an elevation of the location information or an elevation index of the location information, and the azimuth information of the location information includes an azimuth of the location information or an azimuth index of the location information.

In a possible implementation, the trigonometric function value is a sine function value or a cosine function value.

In a possible implementation, when the plurality of trigonometric function values corresponding to the elevation indexes of the plurality of first reference points are sine function values, a sine function value corresponding to an elevation index of an $i^{th}$ first reference point meets the following formula (1):

$$\text{sin\_table\_N}(i) = \sin\left(\frac{\pi r_i}{2N'} \times i\right), \tag{1}$$

where i=0, 1, . . . , and N', $N'=\lfloor N/4 \rfloor$, and $r_i$ indicates a radius of the first circle of longitude, or when the plurality of trigonometric function values corresponding to the elevation indexes of the plurality of first reference points are cosine function values, a cosine function value corresponding to an elevation index of an $i^{th}$ first reference point meets the following formula (2):

$$\text{cos\_table\_N}(i) = \cos\left(\frac{\pi r_i}{2N'} \times i\right), \tag{2}$$

where i=0, 1, . . . , and N', $N'=\lfloor N/4 \rfloor$, and $r_i$ indicates a radius of the first circle of longitude.

In a possible implementation, when the plurality of trigonometric function values corresponding to the azimuth indexes of the plurality of second reference points are sine function values, a sine function value corresponding to an azimuth index of a $j^{th}$ second reference point meets the following formula (3):

$$\text{sin\_table\_M}(j) = \sin\left(\frac{\pi r_j}{2M'} \times j\right), \tag{3}$$

where j=0, 1, . . . , and M', $M'=\lfloor M/4 \rfloor$, and $r_j$ indicates a radius of the first circle of latitude, or when the plurality of trigonometric function values corresponding to the azimuth indexes of the plurality of second reference points are cosine function values, a cosine function value corresponding to an azimuth index of a $j^{th}$ second reference point meets the following formula (4):

$$\text{cos\_table\_M}(j) = \cos\left(\frac{\pi r_j}{2M'} \times j\right), \tag{4}$$

where j=0, 1, . . . , and M', $M'=\lfloor M/4 \rfloor$, and $r_j$ indicates a radius of the first circle of latitude.

In a possible implementation, the elevation φ and the elevation index φ' meet the following formula (5):

$$\varphi' = \text{round}\left(\frac{\varphi}{2\pi r_i \times N}\right), \tag{5}$$

where $r_i$ indicates a radius of the first circle of longitude, and round( ) indicates rounding.

In a possible implementation, the azimuth θ and the azimuth index θ' meet the following formula (6):

$$\theta' = \text{round}\left(\frac{\theta}{2\pi r_j \times M}\right), \tag{6}$$

where $r_j$ indicates a radius of the first circle of latitude, and round( ) indicates rounding.

In the elevation trigonometric function table in which a location of a reference point is represented in a form of an elevation index, assuming that N=1024, the elevation trigonometric function table may include trigonometric function values, for example, sin[0] to sin[256], that respectively correspond to elevation indexes of 257 reference points.

Similarly, in the azimuth trigonometric function table in which a location of a reference point is represented in a form of an azimuth index, assuming that M=1024, the azimuth trigonometric function table may also include trigonometric function values, for example, sin[0] to sin[256], that respectively correspond to azimuth indexes of 257 reference points.

In a possible implementation, when M≠N, the trigonometric function value corresponding to the elevation information of the location information meets the following formulas:

$$\sin(\varphi)=\text{sin\_table\_N}(\varphi') \quad \varphi'<\lfloor N/4\rfloor$$
$$\sin(\varphi)=\text{sin\_table\_N}(N/2-\varphi') \quad \lfloor N/4\rfloor\le\varphi'<\lfloor N/2\rfloor$$
$$\sin(\varphi)=-\text{sin\_table\_N}(\varphi'-N/2) \quad \lfloor N/2\rfloor\le\varphi'<\lfloor 3N/4\rfloor$$
$$\sin(\varphi)=-\text{sin\_table\_N}(N-\varphi') \quad \lfloor 3N/4\rfloor\le\varphi'<N$$
$$\cos(\varphi)=\text{sin\_table\_N}(N/4-\varphi') \quad \varphi'<\lfloor N/4\rfloor$$
$$\cos(\varphi)=-\text{sin\_table\_N}(\varphi'-N/4) \quad \lfloor N/4\rfloor\le\varphi'<\lfloor N/2\rfloor$$
$$\cos(\varphi)=-\text{sin\_table\_N}(3N/4-\varphi') \quad \lfloor N/2\rfloor\le\varphi'<\lfloor 3N/4\rfloor$$
$$\cos(\varphi)=\text{sin\_table\_N}(\varphi'-3N/4) \quad \lfloor 3N/4\rfloor\le\varphi'<N,$$

where φ indicates the elevation information of the location information, or φ indicates the elevation information of the reference point corresponding to the elevation information of the location information, and sin_table_N( ) indicates the elevation trigonometric function table, and when M≠N, the trigonometric function value corresponding to the azimuth information of the location information meets the following formulas:

$$\sin(\theta)=\text{sin\_table\_M}(\theta') \quad \theta'<\lfloor M/4\rfloor$$
$$\sin(\theta)=\text{sin\_table\_M}(M/2-\theta') \quad \lfloor M/4\rfloor\le\theta'<\lfloor M/2\rfloor$$
$$\sin(\theta)=-\text{sin\_table\_M}(\theta'-M/2) \quad \lfloor M/2\rfloor\le\theta'<\lfloor 3M/4\rfloor$$
$$\sin(\theta)=-\text{sin\_table\_M}(M-\theta') \quad \lfloor 3M/4\rfloor\le\theta'<M$$
$$\cos(\theta)=\text{sin\_table\_M}(M/4-\theta') \quad \theta'<\lfloor M/4\rfloor$$
$$\cos(\theta)=-\text{sin\_table\_M}(\theta'-M/4) \quad \lfloor M/4\rfloor\le\theta'<\lfloor M/2\rfloor$$
$$\cos(\theta)=-\text{sin\_table\_M}(3M/4-\theta') \quad \lfloor M/2\rfloor\le\theta'<\lfloor 3M/4\rfloor$$
$$\cos(\theta)=\text{sin\_table\_M}(\theta'-3M/4) \quad \lfloor 3M/4\rfloor\le\theta'<M,$$

where θ indicates the azimuth information of the location information, or θ indicates the azimuth information of the reference point corresponding to the azimuth information of the location information, and sin_table_M( ) indicates the azimuth trigonometric function table, or when M=N, the trigonometric function value corresponding to the elevation information of the location information meets the following formulas:

$$\sin(\varphi)=\text{sin\_table}(\varphi') \quad \varphi'<\lfloor N/4\rfloor$$
$$\sin(\varphi)=\text{sin\_table}(N/2-\varphi') \quad \lfloor N/4\rfloor\le\varphi'<\lfloor N/2\rfloor$$
$$\sin(\varphi)=-\text{sin\_table}(\varphi'-N/2) \quad \lfloor N/2\rfloor\le\varphi'<\lfloor 3N/4\rfloor$$
$$\sin(\varphi)=-\text{sin\_table}(N-\varphi') \quad \lfloor 3N/4\rfloor\le\varphi'<N$$
$$\cos(\varphi)=\text{sin\_table}(N/4-\varphi') \quad \varphi'<\lfloor N/4\rfloor$$
$$\cos(\varphi)=-\text{sin\_table}(\varphi'-N/4) \quad \lfloor N/4\rfloor\le\varphi'<\lfloor N/2\rfloor$$

-continued $$\cos(\varphi)=-\text{sin\_table}(3N/4-\varphi') \quad \lfloor N/2\rfloor\le\varphi'<\lfloor 3N/4\rfloor$$
$$\cos(\varphi)=\text{sin\_table}(\varphi'-3N/4) \quad \lfloor 3N/4\rfloor\le\varphi'<N,$$

where φ indicates the elevation information of the location information, or φ indicates the elevation information of the reference point corresponding to the elevation information of the location information, and sin_table_N( ) indicates the elevation trigonometric function table, and when M=N, the trigonometric function value corresponding to the azimuth information of the location information meets the following formulas:

$$\sin(\theta)=\text{sin\_table}(\theta') \quad \theta'<\lfloor N/4\rfloor$$
$$\sin(\theta)=\text{sin\_table}(N/2-\theta') \quad \lfloor N/4\rfloor\le\theta'<\lfloor N/2\rfloor$$
$$\sin(\theta)=-\text{sin\_table}(\theta'-N/2) \quad \lfloor N/2\rfloor\le\theta'<\lfloor 3N/4\rfloor$$
$$\sin(\theta)=-\text{sin\_table}(N-\theta') \quad \lfloor 3N/4\rfloor\le\theta'<N$$
$$\cos(\theta)=\text{sin\_table}(N/4-\theta') \quad \theta'<\lfloor N/4\rfloor$$
$$\cos(\theta)=-\text{sin\_table}(\theta'-N/4) \quad \lfloor N/4\rfloor\le\theta'<\lfloor N/2\rfloor$$
$$\cos(\theta)=-\text{sin\_table}(3N/4-\theta') \quad \lfloor N/2\rfloor\le\theta'<\lfloor 3N/4\rfloor$$
$$\cos(\theta)=\text{sin\_table}(\theta'-3N/4) \quad \lfloor 3N/4\rfloor\le\theta'<N,$$

where θ indicates the azimuth information of the location information, or θ indicates the azimuth information of the reference point corresponding to the azimuth information of the location information, and sin_table_N( ) indicates the elevation trigonometric function table, or when M≠N, M=K1×N, and K1≥2, the trigonometric function value corresponding to the azimuth information of the location information meets the following formulas:

$$\sin(\theta)=\text{sin\_table\_M}(\theta') \quad \theta'<\lfloor M/4\rfloor$$
$$\sin(\theta)=\text{sin\_table\_M}(M/2-\theta') \quad \lfloor M/4\rfloor\le\theta'<\lfloor M/2\rfloor$$
$$\sin(\theta)=-\text{sin\_table\_M}(\theta'-M/2) \quad \lfloor M/2\rfloor\le\theta'<\lfloor 3M/4\rfloor$$
$$\sin(\theta)=-\text{sin\_table\_M}(M-\theta') \quad \lfloor 3M/4\rfloor\le\theta'<M$$
$$\cos(\theta)=\text{sin\_table\_M}(M/4-\theta') \quad \theta'<\lfloor M/4\rfloor$$
$$\cos(\theta)=-\text{sin\_table\_M}(\theta'-M/4) \quad \lfloor M/4\rfloor\le\theta'<\lfloor M/2\rfloor$$
$$\cos(\theta)=-\text{sin\_table\_M}(3M/4-\theta') \quad \lfloor M/2\rfloor\le\theta'<\lfloor 3M/4\rfloor$$
$$\cos(\theta)=\text{sin\_table\_M}(\theta'-3M/4) \quad \lfloor 3M/4\rfloor\le\theta'<M,$$

where θ indicates the azimuth information of the location information, or θ indicates the azimuth information of the reference point corresponding to the azimuth information of the location information, and sin_table_M( ) indicates the azimuth trigonometric function table, and when M≠N, M=K1×N, and K1≥2, the trigonometric function value corresponding to the elevation information of the location information meets the following formulas:

$$\sin(\varphi)=\text{sin\_table\_M}(K1\times\varphi') \quad K1\times\varphi'<\lfloor M/4\rfloor$$
$$\sin(\varphi)=\text{sin\_table\_M}(M/2-K1\times\varphi') \quad \lfloor M/4\rfloor\le K1\times\varphi'<\lfloor M/2\rfloor$$

-continued $$\sin(\varphi) = -\text{sin\_table\_M}(K1\times\varphi' - M/2) \quad \lfloor M/2\rfloor \le K1\times\varphi' < \lfloor 3M/4\rfloor$$
$$\sin(\varphi) = -\text{sin\_table\_M}(M - K1\times\varphi') \quad \lfloor 3M/4\rfloor \le K1\times\varphi' < M$$
$$\cos(\varphi) = \text{sin\_table\_M}(M/4 - K1\times\varphi') \quad K1\times\varphi' < \lfloor M/4\rfloor$$
$$\cos(\varphi) = -\text{sin\_table\_M}(K1\times\varphi' - M/4) \quad \lfloor M/4\rfloor \le K1\times\varphi' < \lfloor M/2\rfloor$$
$$\cos(\varphi) = -\text{sin\_table\_M}(3M/4 - K1\times\varphi') \quad \lfloor M/2\rfloor \le K1\times\varphi' < \lfloor 3M/4\rfloor$$
$$\cos(\varphi) = \text{sin\_table\_M}(K1\times\varphi' - 3M/4) \quad \lfloor 3M/4\rfloor \le K1\times\varphi' < M,$$

where φ indicates the elevation information of the location information, or φ indicates the elevation information of the reference point corresponding to the elevation information of the location information, and sin_table_M( ) indicates the azimuth trigonometric function table, or when M≠N, N=K2×M, and K2≥2, the trigonometric function value corresponding to the elevation information of the location information meets the following formulas:

$$\sin(\varphi) = \text{sin\_table\_N}(\varphi') \quad \varphi' < \lfloor N/4\rfloor$$
$$\sin(\varphi) = \text{sin\_table\_N}(N/2 - \varphi') \quad \lfloor N/4\rfloor \le \varphi' < \lfloor N/2\rfloor$$
$$\sin(\varphi) = -\text{sin\_table\_N}(\varphi' - N/2) \quad \lfloor N/2\rfloor \le \varphi' < \lfloor 3N/4\rfloor$$
$$\sin(\varphi) = -\text{sin\_table\_N}(N - \varphi') \quad \lfloor 3N/4\rfloor \le \varphi' < N$$
$$\cos(\varphi) = \text{sin\_table\_N}(N/4 - \varphi') \quad \varphi' < \lfloor N/4\rfloor$$
$$\cos(\varphi) = -\text{sin\_table\_N}(\varphi' - N/4) \quad \lfloor N/4\rfloor \le \varphi' < \lfloor N/2\rfloor$$
$$\cos(\varphi) = -\text{sin\_table\_N}(3N/4 - \varphi') \quad \lfloor N/2\rfloor \le \varphi' < \lfloor 3N/4\rfloor$$
$$\cos(\varphi) = \text{sin\_table\_N}(\varphi' - 3N/4) \quad \lfloor 3N/4\rfloor \le \varphi' < N,$$

where φ indicates the elevation information of the location information, or φ indicates the elevation information of the reference point corresponding to the elevation information of the location information, and sin_table_N( ) indicates the elevation trigonometric function table, and when M≠N, N=K2×M, and K2≥2, the trigonometric function value corresponding to the azimuth information of the location information meets the following formulas:

$$\sin(\theta) = \text{sin\_table\_N}(K2\times\theta') \quad K2\times\theta' < \lfloor N/4\rfloor$$
$$\sin(\theta) = \text{sin\_table\_N}(N/2 - K2\times\theta') \quad \lfloor N/4\rfloor \le K2\times\theta' < \lfloor N/2\rfloor$$
$$\sin(\theta) = -\text{sin\_table\_N}(K2\times\theta' - N/2) \quad \lfloor N/2\rfloor \le K2\times\theta' < \lfloor 3N/4\rfloor$$
$$\sin(\theta) = -\text{sin\_table\_N}(N - K2\times\theta') \quad \lfloor 3N/4\rfloor \le K2\times\theta' < N$$
$$\cos(\theta) = \text{sin\_table\_N}(N/4 - K2\times\theta') \quad K2\times\theta' < \lfloor N/4\rfloor$$
$$\cos(\theta) = -\text{sin\_table\_N}(K2\times\theta' - N/4) \quad \lfloor N/4\rfloor \le K2\times\theta' < \lfloor N/2\rfloor$$
$$\cos(\theta) = -\text{sin\_table\_N}(3N/4 - K2\times\theta') \quad \lfloor N/2\rfloor \le K2\times\theta' < \lfloor 3N/4\rfloor$$
$$\cos(\theta) = \text{sin\_table\_N}(K2\times\theta' - 3N/4) \quad \lfloor 3N/4\rfloor \le K2\times\theta' < N,$$

where θ indicates the azimuth information of the location information, or θ indicates the azimuth information of the reference point corresponding to the azimuth information of the location information, and sin_table_N( ) indicates the elevation trigonometric function table, or when M≠N, the trigonometric function value corresponding to the elevation information of the location information meets the following formulas:

$$\sin(\theta) = \text{cos\_table\_N}(N/4 - \theta') \quad \theta' < \lfloor N/4\rfloor$$
$$\sin(\theta) = \text{cos\_table\_N}(\theta' - N/4) \quad \lfloor N/4\rfloor \le \theta' < \lfloor N/2\rfloor$$
$$\sin(\theta) = -\text{cos\_table\_N}(3N/4 - \theta') \quad \lfloor N/2\rfloor \le \theta' < \lfloor 3N/4\rfloor$$
$$\sin(\theta) = -\text{cos\_table\_N}(\theta' - 3N/4) \quad \lfloor 3N/4\rfloor \le \theta' < N$$
$$\cos(\theta) = \text{cos\_table\_N}(\theta') \quad \theta' < \lfloor N/4\rfloor$$
$$\cos(\theta) = -\text{cos\_table\_N}(N/2 - \theta') \quad \lfloor N/4\rfloor \le \theta' < \lfloor N/2\rfloor$$
$$\cos(\theta) = -\text{cos\_table\_N}(\theta' - N/2) \quad \lfloor N/2\rfloor \le \theta' < \lfloor 3N/4\rfloor$$
$$\cos(\theta) = \text{cos\_table\_N}(N - \theta') \quad \lfloor 3N/4\rfloor \le \theta' < N,$$

where φ indicates the elevation information of the location information, or φ indicates the elevation information of the reference point corresponding to the elevation information of the location information, and cos_table_N( ) indicates the elevation trigonometric function table, and when M≠N, the trigonometric function value corresponding to the azimuth information of the location information meets the following formulas:

$$\sin(\theta) = \text{cos\_table\_M}(M/4 - \theta') \quad \theta' < \lfloor M/4\rfloor$$
$$\sin(\theta) = \text{cos\_table\_M}(\theta' - M/4) \quad \lfloor M/4\rfloor \le \theta' < \lfloor M/2\rfloor$$
$$\sin(\theta) = -\text{cos\_table\_M}(3M/4 - \theta') \quad \lfloor M/2\rfloor \le \theta' < \lfloor 3M/4\rfloor$$
$$\sin(\theta) = -\text{cos\_table\_M}(\theta' - 3M/4) \quad \lfloor 3M/4\rfloor \le \theta' < M$$
$$\cos(\theta) = \text{cos\_table\_M}(\theta') \quad \theta' < \lfloor M/4\rfloor$$
$$\cos(\theta) = -\text{cos\_table\_M}(M/2 - \theta') \quad \lfloor M/4\rfloor \le \theta' < \lfloor M/2\rfloor$$
$$\cos(\theta) = -\text{cos\_table\_M}(\theta' - M/2) \quad \lfloor M/2\rfloor \le \theta' < \lfloor 3M/4\rfloor$$
$$\cos(\theta) = \text{cos\_table\_M}(M - \theta') \quad \lfloor 3M/4\rfloor \le \theta' < M,$$

where θ indicates the azimuth information of the location information, or θ indicates the azimuth information of the reference point corresponding to the azimuth information of the location information, and cos_table_M( ) indicates the azimuth trigonometric function table.

According to a third aspect, this disclosure provides an audio processing device, including one or more processors, and a memory configured to store one or more programs, where when the one or more programs are executed by the one or more processors, the one or more processors are enabled to implement the method according to any one of the implementations of the first aspect.

According to a fourth aspect, this disclosure provides a computer-readable storage medium, including a computer program. When the computer program is executed on a computer, the computer is enabled to perform the method according to any one of the implementations of the first aspect.

DESCRIPTION OF EMBODIMENTS

Figure 1:
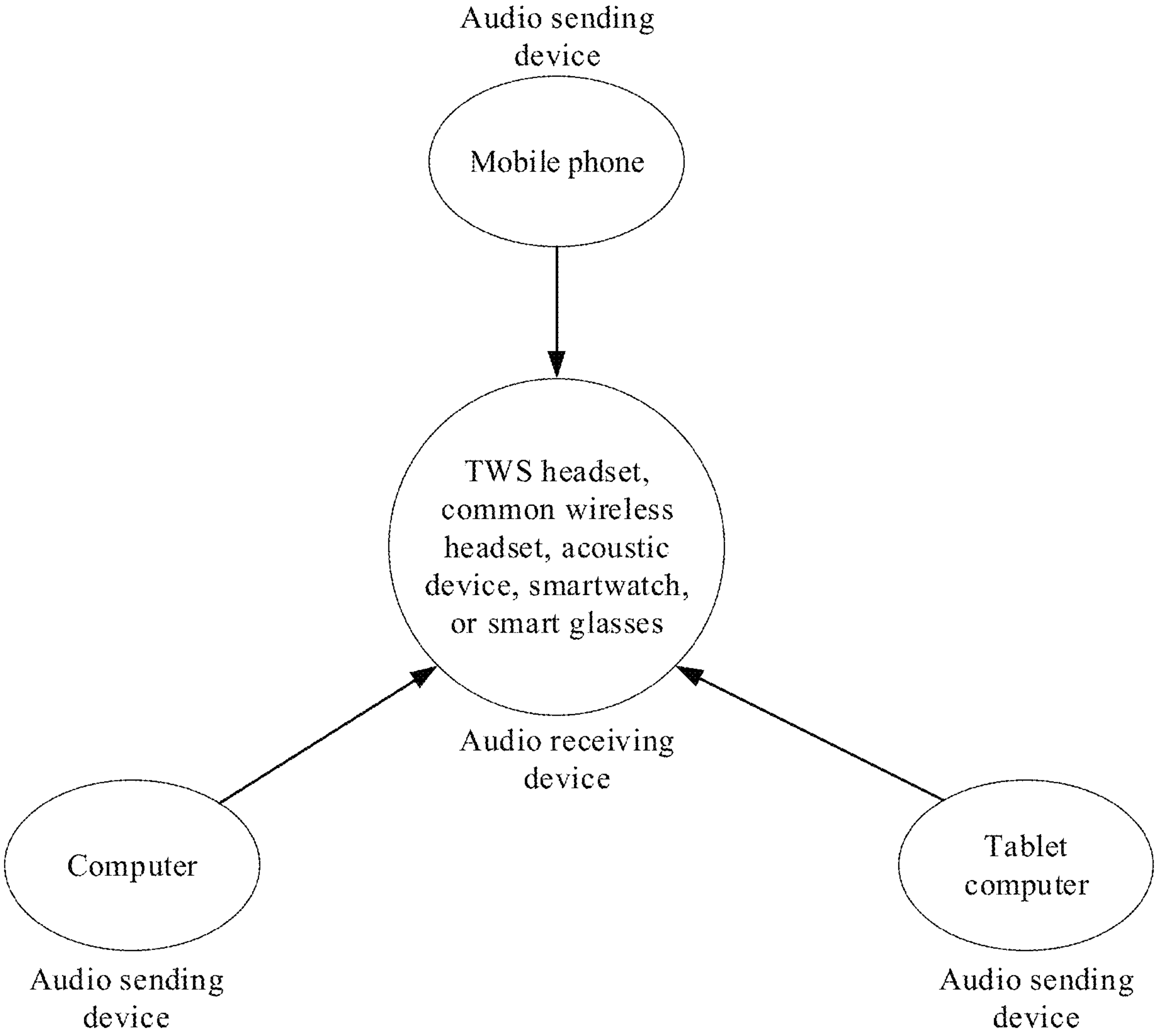
FIG. 1 is a diagram of an example structure of an audio play system according to this disclosure.

To make objectives, technical solutions, and advantages of this disclosure clearer, the following clearly describes technical solutions in this disclosure with reference to accompanying drawings in this disclosure. Described embodiments are merely some but not all of embodiments of this disclosure. All other embodiments obtained by a person of ordinary skill in the art based on embodiments of this disclosure without creative efforts shall fall within the protection scope of this disclosure.

In embodiments of the specification, claims, and accompanying drawings of this disclosure, the terms "first", "second", and the like are merely intended for distinguishing and description, and shall not be understood as an indication or implication of relative importance or an indication or implication of an order. In addition, the terms "include", "comprise", and any variant thereof are intended to cover non-exclusive inclusion, for example, inclusion of a series of steps or units. A method, a system, a product, or a device is not necessarily limited to clearly listed steps or units, but may include other steps or units that are not clearly listed and that are inherent to the process, the method, the product, or the device.

It should be understood that, in this disclosure, "at least one" means one or more, and "a plurality of" means two or more. The term "and/or" describes an association relationship between associated objects, and indicates that three relationships may exist. For example, "A and/or B" may indicate the following three cases: only A exists, only B exists, and both A and B exist, where A and B may be singular or plural. The character "/" usually indicates an "or" relationship between the associated objects. "At least one of the following items" or a similar expression thereof indicates any combination of the items, including one of the items or any combination of a plurality of the items. For example, at least one of a, b, or c may indicate a, b, c, "a and b", "a and c", "b and c", or "a, b, and c", where a, b, and c may be singular or plural. Two values connected by the character "—" usually indicate a value range, and the value range includes the two values connected by the character "—".

Related terms in this disclosure are described below.

Audio frame: Audio data is in a stream form. In actual application, to facilitate audio processing and transmission, audio data within specific duration is usually selected as a frame of audio. The duration is referred to as "sampling time", and a value of the duration may be determined according to a requirement of a codec and a specific application. For example, the duration ranges from 2.5 milliseconds (ms) to 60 ms.

Audio signal: An audio signal is a frequency and amplitude change information carrier of a regular sound wave with voice, music, and sound effect. Audio is a continuously changing analog signal, and may be represented by a continuous curve and referred to as a sound wave. A digital signal generated based on audio through analog-to-digital conversion or by a computer is an audio signal. A sound wave has three important parameters: a frequency, an amplitude, and a phase. This determines features of an audio signal.

The following describes a system architecture to which this disclosure is applied.

FIG. 1 is a diagram of an example structure of an audio play system according to this disclosure. As shown in FIG. 1, the audio play system includes an audio sending device and an audio receiving device. The audio sending device includes a device that can encode audio and send an audio bitstream, for example, a mobile phone, a computer (a notebook computer, a desktop computer, or the like), or a tablet computer (a handheld tablet computer, a vehicle-mounted tablet computer, or the like). The audio receiving device includes a device that can receive an audio bitstream, decode the audio bitstream, and play audio, for example, a true wireless stereo (TWS) headset, a common wireless headset, an acoustic device, a smartwatch, or smart glasses.

A BLUETOOTH connection may be established between the audio sending device and the audio receiving device, and voice and music can be transmitted between the audio sending device and the audio receiving device. General examples of the audio sending device and the audio receiving device are a mobile phone and a TWS headset, a wireless head-mounted headset, or a wireless neckband headset, or a mobile phone and another terminal device (for example, a smart speaker, a smartwatch, smart glasses, or a vehicle-mounted speaker). Optionally, examples of the audio sending device and the audio receiving device may alternatively be a tablet computer, a notebook computer, or a desktop computer, and a TWS headset, a wireless head-mounted headset, a wireless neckband headset, or another terminal device (for example, a smart speaker, a smartwatch, smart glasses, or a vehicle-mounted speaker).

It should be noted that, in addition to the BLUETOOTH connection, the audio sending device and the audio receiving device may alternatively be connected in another communication mode, for example, a WI-FI connection, a wired connection, or another wireless connection. This is not limited in this disclosure.

Figure 2:
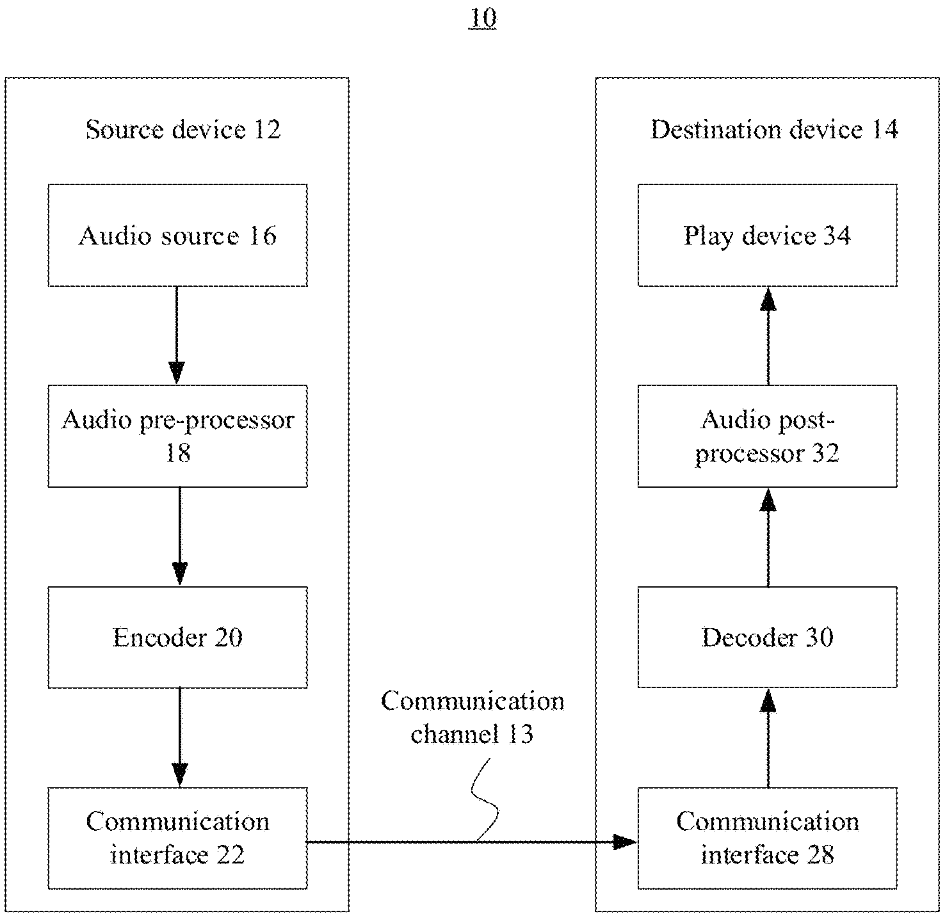
FIG. 2 is a diagram of an example structure of an audio decoding system according to this disclosure.

FIG. 2 is a diagram of an example structure of an audio decoding system 10 according to this disclosure. As shown in FIG. 2, the audio decoding system 10 may include a source device 12 and a destination device 14. The source device 12 may be the audio sending device in FIG. 1, and the destination device 14 may be the audio receiving device in FIG. 1. The source device 12 generates encoded bitstream information. Therefore, the source device 12 may also be referred to as an audio encoding device. The destination device 14 may decode the encoded bitstream generated by the source device 12. Therefore, the destination device 14 may also be referred to as an audio decoding device. In this disclosure, the source device 12 and the audio encoding device may be collectively referred to as the audio sending device, and the destination device 14 and the audio decoding device may be collectively referred to as the audio receiving device.

The source device 12 includes an encoder 20, and optionally, may include an audio source 16, an audio pre-processor 18, and a communication interface 22.

The audio source 16 may include or may be any type of audio capture device, for example, an audio capture device for capturing real-world sound, and/or any type of audio generation device, for example, a computer audio processor, or any type of device for obtaining and/or providing real-world audio, computer animation audio (for example, screen content or audio in virtual reality (VR), and/or any combination thereof (for example, audio in augmented reality (AR), audio in mixed reality (MR), and/or audio in extended reality (XR)). The audio source 16 may be a microphone for capturing audio or a memory for storing audio. The audio source 16 may further include any type of (internal or external) interface for storing previously captured or generated audio and/or obtaining or receiving audio. When the audio source 16 is a microphone, the audio source 16 may be, for example, a local audio capture apparatus or an audio capture apparatus integrated in the source device. When the audio source 16 is a memory, the audio source 16 may be, for example, a local memory or a memory integrated in the source device. When the audio source 16 includes an interface, the interface may be, for example, an external interface for receiving audio from an external audio source. The external audio source is, for example, an external audio capture device, such as a speaker, a microphone, an external memory, or an external audio generation device. The external audio generation device is, for example, an external computer audio processor, a computer, or a server. The interface may be any type of interface, for example, a wired or wireless interface or an optical interface, according to any proprietary or standardized interface protocol.

In this disclosure, the audio source 16 obtains a current-scene audio signal. The current-scene audio signal is an audio signal obtained by capturing a sound field at a location of a microphone in space, and the current-scene audio signal may also be referred to as a raw-scene audio signal. For example, the current-scene audio signal may be an audio signal obtained by using an HOA technology. The audio source 16 obtains a to-be-encoded HOA signal. For example, the HOA signal may be obtained by using an actual capture device, or the HOA signal may be obtained through synthesis of an artificial audio object. Optionally, the to-be-encoded HOA signal may be a time-domain HOA signal or a frequency-domain HOA signal.

The audio pre-processor 18 is configured to receive a raw audio signal and pre-process the raw audio signal to obtain a pre-processed audio signal. For example, the pre-processing performed by the audio pre-processor 18 may include shaping or denoising.

The encoder 20 is configured to receive the pre-processed audio signal and process the pre-processed audio signal to provide encoded bitstream information.

The communication interface 22 of the source device 12 may be configured to receive bitstream information and send the bitstream to the destination device 14 through a communication channel 13. The communication channel 13 is, for example, a direct wired or wireless connection, any type of network such as a wired or wireless network or any combination thereof, or any type of private network or public network or any combination thereof.

The destination device 14 includes a decoder 30, and optionally, may include a communication interface 28, an audio post-processor 32, and a play device 34.

The communication interface 28 of the destination device 14 is configured to directly receive bitstream information from the source device 12, and provide the bitstream information for the decoder 30. The communication interface 22 and the communication interface 28 may be configured to send or receive bitstream information through the communication channel 13 between the source device 12 and the destination device 14.

The communication interface 22 and the communication interface 28 each may be configured as a unidirectional communication interface indicated by an arrow, in FIG. 2, that corresponds to the communication channel 13 and that is directed from the source device 12 to the destination device 14, or a bidirectional communication interface, and may be configured to send and receive messages or the like to establish a connection, determine and exchange any other information related to a communication link and/or transmission of data such as encoded audio data, and the like.

The decoder 30 is configured to receive bitstream information and decode the bitstream information to obtain decoded audio data.

The audio post-processor 32 is configured to post-process the decoded audio data to obtain post-processed audio data. The post-processing performed by the audio post-processor 32 may include, for example, trimming or resampling.

The play device 34 is configured to receive the post-processed audio data, to play audio to a user or a listener. The play device 34 may be or include any type of player for playing reconstructed audio, for example, an integrated or external speaker. For example, the speaker may include a loudspeaker or an acoustic device.

Figure 3:
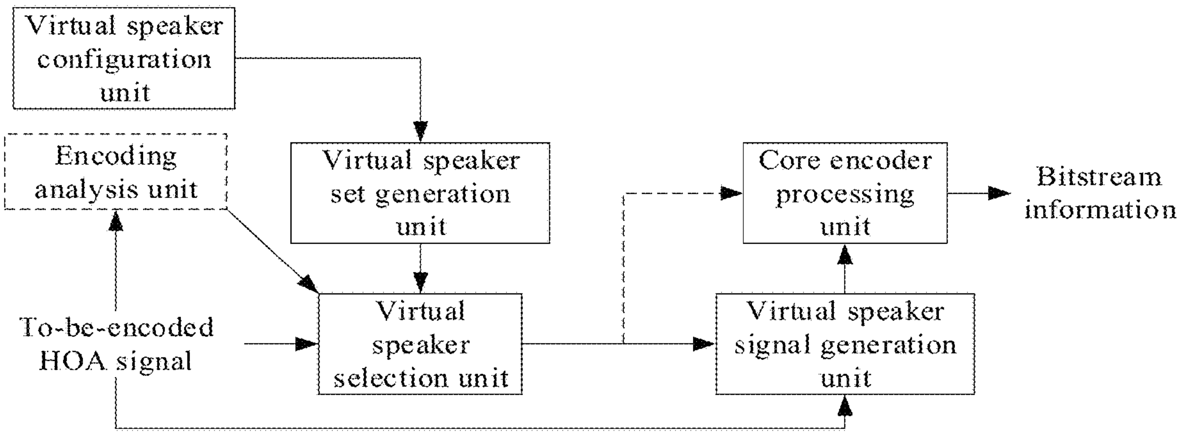
FIG. 3 is a diagram of an example structure of an HOA encoding apparatus according to this disclosure.

FIG. 3 is a diagram of an example structure of an HOA encoding apparatus according to this disclosure. As shown in FIG. 3, the HOA encoding apparatus may be used in the encoder 20 in the audio decoding system 10. The HOA encoding apparatus includes a virtual speaker configuration unit, an encoding analysis unit, a virtual speaker set generation unit, a virtual speaker selection unit, a virtual speaker signal generation unit, and a core encoder processing unit.

The virtual speaker configuration unit is configured to configure a virtual speaker based on encoder configuration information, to obtain a virtual speaker configuration parameter. The encoder configuration information includes but is not limited to an HOA order, an encoding bit rate, user-defined information, and the like. The virtual speaker configuration parameter includes but is not limited to a quantity of virtual speakers, an HOA order of the virtual speaker, and the like.

The virtual speaker configuration parameter output by the virtual speaker configuration unit is input for the virtual speaker set generation unit.

The encoding analysis unit is configured to perform encoding analysis on a to-be-encoded HOA signal, for example, analyze sound field distribution of the to-be-encoded HOA signal, including features such as a quantity of sound sources, directivity, and dispersity of the to-be-encoded HOA signal. The sound field distribution is used as one of determining conditions for determining how to select a target virtual speaker.

Alternatively, in this disclosure, the HOA encoding apparatus may not include the encoding analysis unit. To be specific, the HOA encoding apparatus may not analyze an input signal. In this case, how to select a target virtual speaker is determined by using a default configuration.

The HOA encoding apparatus obtains the to-be-encoded HOA signal. For example, an HOA signal recorded from an actual capture device or an HOA signal obtained through synthesis of an artificial audio object may be used as input for the encoder, and the to-be-encoded HOA signal input to the encoder may be a time-domain HOA signal or a frequency-domain HOA signal.

The virtual speaker set generation unit is configured to generate a virtual speaker set. The virtual speaker set may include a plurality of virtual speakers, and the virtual speaker in the virtual speaker set may also be referred to as a "candidate virtual speaker".

The virtual speaker set generation unit generates an HOA coefficient for a specified candidate virtual speaker. Coordinates (namely, location information) of the candidate virtual speaker and an HOA order of the candidate virtual speaker that are provided by the virtual speaker configuration unit are used to generate the HOA coefficient for the candidate virtual speaker. A method for determining the coordinates of the candidate virtual speaker includes but is not limited to generating K virtual speakers according to an equidistance rule, generating K nonuniformly distributed candidate virtual speakers according to an auditory perception principle, and generating coordinates of uniformly distributed candidate virtual speakers based on a quantity of candidate virtual speakers.

Then the HOA coefficient for the candidate virtual speaker is generated.

Herein, an HOA coefficient for each virtual speaker is obtained and represented by using a method for obtaining an HOA coefficient in this disclosure, to obtain the virtual speaker set.

The HOA coefficient for the candidate virtual speaker that is output by the virtual speaker set generation unit is input for the virtual speaker selection unit.

The virtual speaker selection unit is configured to select a target virtual speaker from the plurality of candidate virtual speakers in the virtual speaker set based on the to-be-encoded HOA signal. The target virtual speaker may be referred to as a "virtual speaker matching the to-be-encoded HOA signal", or a matching virtual speaker for short.

The virtual speaker selection unit selects a specified matching virtual speaker based on the to-be-encoded HOA signal and the HOA coefficient for the candidate virtual speaker that is output by the virtual speaker set generation unit.

The following describes a method for selecting a matching virtual speaker by using an example. In a possible implementation, an inner product is calculated, through matching, between the HOA coefficient for the candidate virtual speaker and the to-be-encoded HOA signal, a candidate virtual speaker corresponding to a largest absolute value of an inner product is selected as a target virtual speaker, namely, a matching virtual speaker, a projection of the to-be-encoded HOA signal on the candidate virtual speaker is superposed on a linear combination of the HOA coefficient for the candidate virtual speaker, then a projection vector is subtracted from the to-be-encoded HOA signal to obtain a difference, and the foregoing process is repeatedly performed on the difference to implement iterative calculation, where one matching virtual speaker is generated in each iteration, and coordinates of the matching virtual speaker and an HOA coefficient for the matching virtual speaker are output. It can be understood that a plurality of matching virtual speakers are selected, and one matching virtual speaker is generated in each iteration. (Alternatively, another implementation method may be used.)

The coordinates of the target virtual speaker and the HOA coefficient for the target virtual speaker that are output by the virtual speaker selection unit are input for the virtual speaker signal generation unit.

The virtual speaker signal generation unit is configured to generate a virtual speaker signal based on the to-be-encoded HOA signal and attribute information of the target virtual speaker. When the attribute information is location information, the HOA coefficient for the target virtual speaker is determined based on the location information of the target virtual speaker. When the attribute information includes the HOA coefficient, the HOA coefficient for the target virtual speaker is obtained from the attribute information.

The virtual speaker signal generation unit calculates the virtual speaker signal by using the to-be-encoded HOA signal and the HOA coefficient for the target virtual speaker.

The HOA coefficient for the virtual speaker is represented by a matrix A, and the to-be-encoded HOA signal may be obtained through linear combination by using the matrix A. Further, a theoretical optimal solution w, namely, the virtual speaker signal, may be obtained by using a least square method. For example, the following calculation formula may be used:

$$w = A^{-1}X,$$

where $A^{-1}$ indicates an inverse matrix of the matrix A, a size of the matrix A is (M×C), C is a quantity of target virtual speakers, M is a quantity of channels of an N-order HOA coefficient, $M=(N+1)^2$, and a indicates the HOA coefficient for the target virtual speaker, for example:

$$A = \begin{bmatrix} a_{11} & \cdots & a_{1C} \\ \vdots & \ddots & \vdots \\ a_{M1} & \cdots & a_{MC} \end{bmatrix},$$

and

X indicates the to-be-encoded HOA signal, a size of the matrix X is (M×L), M is a quantity of channels of an N-order HOA coefficient, L is a quantity of time-domain or frequency-domain sampling points, and x indicates a coefficient for the to-be-encoded HOA signal, for example:

$$X = \begin{bmatrix} x_{11} & \cdots & x_{1L} \\ \vdots & \ddots & \vdots \\ x_{M1} & \cdots & x_{ML} \end{bmatrix}$$

The virtual speaker signal output by the virtual speaker signal generation unit in input for the core encoder processing unit.

The core encoder processing unit is configured to perform core encoder processing on the virtual speaker signal to obtain a transmission bitstream.

The core encoder processing includes but is not limited to transformation, quantization, a psychoacoustic model, bitstream generation, and the like. Processing may be performed on a frequency-domain transmission channel or a time-domain transmission channel. This is not limited herein.

Based on the descriptions of the foregoing embodiments, this disclosure provides a method for obtaining an HOA coefficient.

Figure 4:
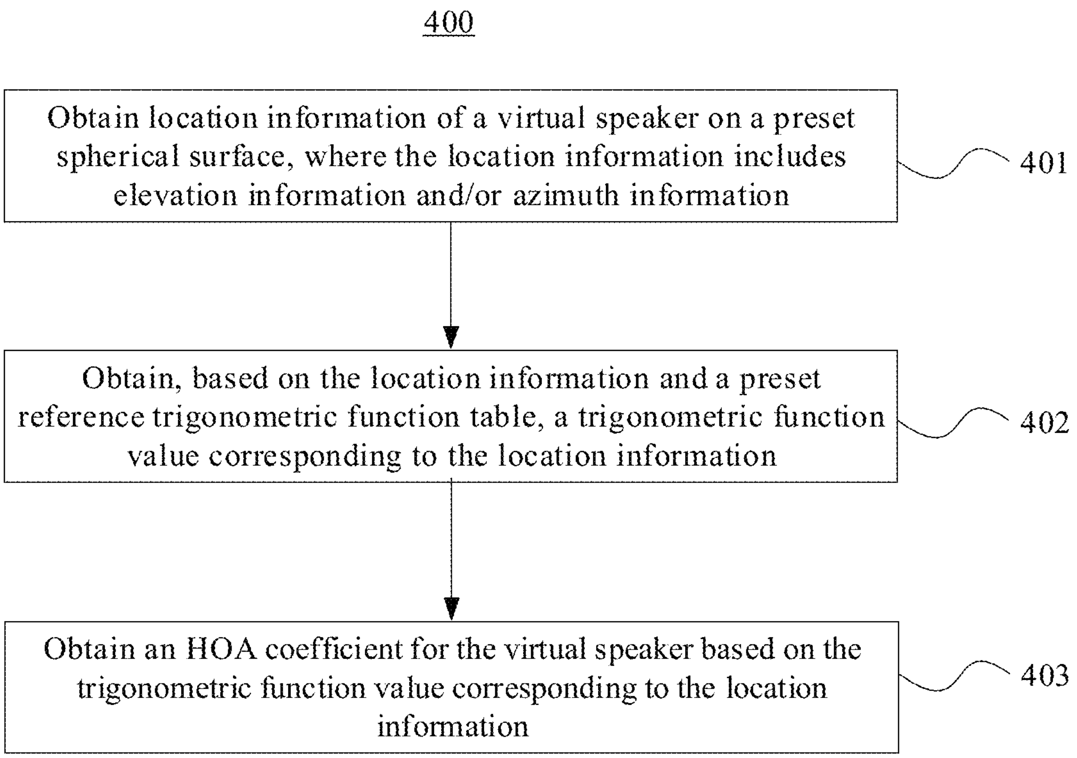
FIG. 4 is an example flowchart of a method for obtaining an HOA coefficient according to this disclosure.

FIG. 4 is an example flowchart of a method for obtaining an HOA coefficient according to this disclosure. The process 400 may be performed by the encoder 20 or the decoder 30 in the foregoing embodiments. To be specific, the encoder 20 in the audio sending device implements audio encoding, and then sends bitstream information to the audio receiving device. The decoder in the audio receiving device decodes the bitstream information to obtain a target audio frame, and then performs rendering based on the target audio frame to obtain a sound field audio signal corresponding to one or more virtual speakers. The process 400 is described as a series of steps or operations. It should be understood that the steps or the operations of the process 400 may be performed in various sequences and/or simultaneously, and are not limited to an execution sequence shown in FIG. 4. As shown in FIG. 4, the method includes the following steps.

Step 401: Obtain location information of a virtual speaker on a preset spherical surface, where the location information includes elevation information and/or azimuth information.

Figure 5:
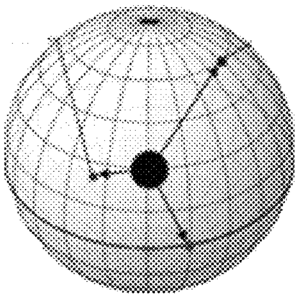
FIG. 5 is an example schematic diagram of a preset spherical surface according to this disclosure.

The preset spherical surface includes M circles of longitude and N circles of latitude. M and N may be the same or different. Both M and N are positive integers. For example, N is 512, 768, or 1024, and M is 512, 768, or 1024. An intersection between the circle of longitude and the circle of latitude is referred to as a reference point. N reference points located on one circle of longitude are arranged at equal spacings, and M reference points located on one circle of latitude are arranged at equal spacings. To ensure that the reference points can cover all virtual speakers as much as possible, the following condition may be met: $M \times N \geq K$, where K is a total quantity of virtual speakers. For example, a value of K may be 2048, 1669, 1024, or 530. For example, FIG. 5 is an example schematic diagram of a preset spherical surface according to this disclosure. As shown in FIG. 5, it is assumed that a spatial sound field is a spherical space with a rendering center as a sphere center. A virtual speaker may be deployed on a spherical surface of the spherical space. The spherical surface is divided by M circles of longitude and N circles of latitude. A plane on which any circle of longitude is located includes the spherical center. Therefore, radii of the M circles of longitude are equal to a radius of the spherical space. A radius of only the equator among the circles of latitude is equal to the radius of the spherical space, and another circle of latitude farther away from the equator has a smaller radius. In this disclosure, because azimuth differences between every two adjacent circles of longitude are equal, that is, the M circles of longitude are evenly distributed on the spherical surface, M reference points located on one circle of latitude are arranged at equal spacings, and because elevation differences between every two adjacent circles of latitude are also equal, that is, the N circles of latitude are evenly distributed on the spherical surface, N reference points located on one circle of longitude are arranged at equal spacings. Correspondingly, because N reference points located on one circle of longitude are arranged at equal spacings, elevation differences between all adjacent reference points located on one circle of longitude are equal, and because M reference points located on one circle of latitude are arranged at equal spacings, azimuth differences between all adjacent reference points located on one circle of latitude are equal.

Figure 6:
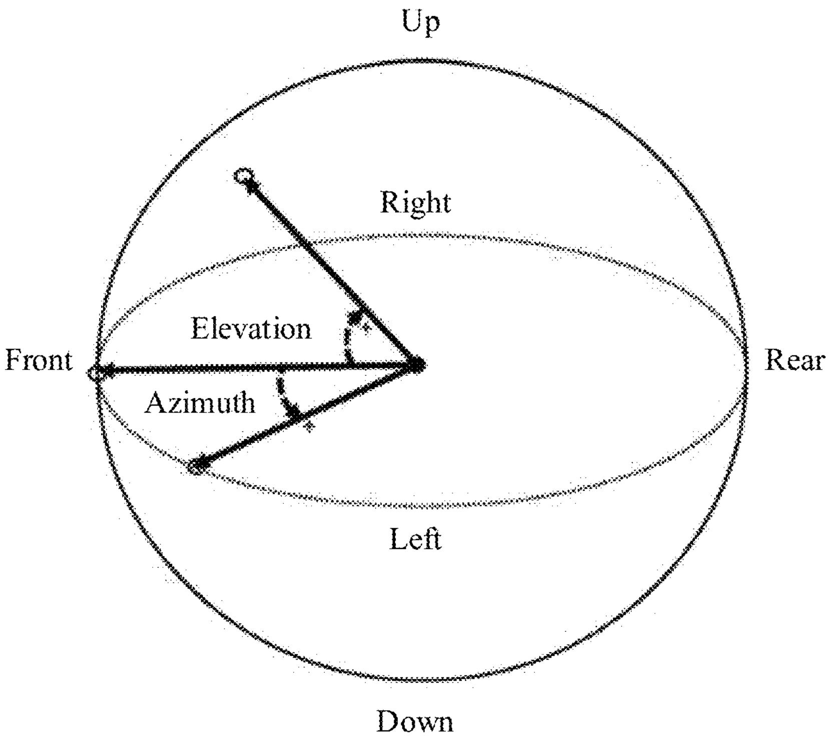
FIG. 6 is an example schematic diagram of location information according to this disclosure.

The virtual speaker may be any virtual speaker disposed for sound rendering. The location information of the virtual speaker on the spherical surface includes elevation information and/or azimuth information. For example, FIG. 6 is an example schematic diagram of location information according to this disclosure. As shown in FIG. 6, an included angle between a preset horizontal plane (for example, a plane on which the equator is located, a plane on which the south pole is located, or plane on which the north pole is located, where the plane on which the south pole is located is perpendicular to a connection line between the south pole and the north pole, and the plane on which the north pole is located is perpendicular to the connection line between the south pole and the north pole) and a connection line between a location of the virtual speaker and a center of the earth is the elevation information of the virtual speaker, and an included angle between a specified initial direction and a projection, on the horizontal plane, of the connection line between the location of the virtual speaker and the center of the earth is the azimuth information of the location information of the virtual speaker.

Optionally, the elevation information of the location information of the virtual speaker may be represented by an elevation or an elevation index, and similarly, the azimuth information of the location information of the virtual speaker may be represented by an azimuth or an azimuth index.

For example, there are N reference points on a circle of longitude, the N reference points are arranged at equal spacings, and a difference between elevation information of two adjacent reference points is $2\pi/N$. Therefore, elevation information of each of the N reference points may be represented by an elevation index of the reference point, that is, elevation information of the N reference points may be represented as 0 to $N-1$. If the location of the virtual speaker is exactly at a reference point, the elevation information of the virtual speaker may be represented by the foregoing elevation index. Similarly, there are M reference points on a circle of latitude, the M reference points are arranged at equal spacings, and a difference between azimuth information of two adjacent reference points is $2\pi/M$. Therefore, azimuth information of each of the M reference points may be represented by an azimuth index of the reference point, that is, azimuth information of the M reference points may be represented as 0 to $M-1$. If the location of the virtual speaker is exactly at a reference point, the azimuth information of the virtual speaker may be represented by the foregoing azimuth index. It can be learned that an elevation index and an elevation of a reference point are in a one-to-one correspondence, and an azimuth index and an azimuth of a reference point are in a one-to-one correspondence. However, if the location of the virtual speaker is not at a location of a reference point, a specific reference point whose elevation index and/or azimuth index are to be used to represent the location information of the virtual speaker cannot be determined. Therefore, the location information of the virtual speaker may be represented by an elevation and/or an azimuth. It should be understood that, even if the location of the virtual speaker is exactly at a reference point, the location information of the virtual speaker may also be represented by an elevation and/or an azimuth. This is not limited herein.

Step 402: Obtain, based on the location information and a preset reference trigonometric function table, a trigonometric function value corresponding to the location information.

The reference trigonometric function table includes an elevation trigonometric function table and/or an azimuth trigonometric function table.

The elevation trigonometric function table includes a plurality of trigonometric function values corresponding to elevation indexes of a plurality of first reference points. The plurality of first reference points are reference points on a first circle of longitude. A quantity of the plurality of first reference points is not less than $\lfloor N/4 \rfloor + 1$, where $\lfloor\ \rfloor$ indicates rounding down. The first circle of longitude is one of the M circles of longitude.

In this disclosure, any one of the M circles of longitude is selected as the first circle of longitude, and reference points (namely, the plurality of first reference points) used for calculating the elevation trigonometric function table are selected from the N reference points on the first circle of longitude. According to a principle of a trigonometric function, an angle range of 0° (0) to 360° (2π) may be divided into four sub-ranges: 0° (0) to 90° (π/2), 90° (π/2) to 180° (π), 180° (π) to 270° (3π/2), and 270° (3π/2) to 360° (2π). A trigonometric function value calculated by using any one of the four sub-ranges may be extended to a trigonometric function value within the angle range of 0° (0) to 360° (2π). Therefore, in this disclosure, during selection of the plurality of first reference points, the quantity of the plurality of first reference points is not less than ⌊N/4⌋+1. To be specific, at least a quarter of the N reference points on the first circle of longitude are selected as the plurality of first reference points. Further, elevations of any two reference points of the selected plurality of first reference points do not overlap during calculation of a trigonometric function value.

Optionally, elevations of the plurality of first reference points may belong to one of the four sub-ranges. For example, the elevations of the plurality of first reference points are within the sub-range of 0° (0) to 90° (π/2), or the elevations of the plurality of first reference points are within the sub-range of 90° (π/2) to 180° (π), or the elevations of the plurality of first reference points are within the sub-range of 180° (π) to 270° (3π/2), or the elevations of the plurality of first reference points are within the sub-range of 270° (3π/2) to 360° (2π).

Optionally, the elevations of the plurality of first reference points may belong to at least two of the four sub-ranges. For example, an elevation of a first part of the plurality of first reference points is within the sub-range of 0° (0) to 90° (π/2), and an elevation of a second part of reference points is within the sub-range of 90° (π/2) to 180° (π), where the elevations of the two parts of reference points do not overlap during calculation of a trigonometric function value, or an elevation of a part of the plurality of first reference points is within the sub-range of 90° (π/2) to 180° (π), and an elevation of another part of reference points is within the sub-range of 180° (π) to 270° (3π/2), where the elevations of the two parts of reference points do not overlap during calculation of a trigonometric function value, or an elevation of a part of the plurality of first reference points is within the sub-range of 180° (π) to 270° (3π/2), and an elevation of another part of reference points is within the sub-range of 270° (3π/2) to 360° (2π), where the elevations of the two parts of reference points do not overlap during calculation of a trigonometric function value, or an elevation of a first part of the plurality of first reference points is within the sub-range of 0° (0) to 90° (π/2), an elevation of a second part of reference points is within the sub-range of 90° (π/2) to 180° (π), and an elevation of a third part of reference points is within the sub-range of 180° (π) to 270° (3π/2), where the elevations of the three parts of reference points do not overlap during calculation of a trigonometric function value, or an elevation of a first part of the plurality of first reference points is within the sub-range of 90° (π/2) to 180° (π), an elevation of a second part of reference points is within the sub-range of 180° (π) to 270° (3π/2), and an elevation of a third part of reference points is within the sub-range of 270° (3π/2) to 360° (2π), where the elevations of the three parts of reference points do not overlap during calculation of a trigonometric function value, or an elevation of a first part of the plurality of first reference points is within the sub-range of 0° (0) to 90° (π/2), an elevation of a second part of reference points is within the sub-range of 90° (π/2) to 180° (π), an elevation of a third part of reference points is within the sub-range of 180° (π) to 270° (3π/2), and an elevation of a fourth part of reference points is within the sub-range of 270° (3π/2) to 360° (2π), where the elevations of the four parts of reference points do not overlap during calculation of a trigonometric function value.

The not overlapping may mean that trigonometric function values calculated by using elevations belonging to different sub-ranges are not equal. For example, there are a total of four first reference points (n1, n2, n3, and n4), where an elevation of n1 is 0, an elevation of n2 is π/6, an elevation of n3 is π/3, and an elevation of n4 is π/2, or an elevation of n1 is 0, an elevation of n2 is 2/3π, an elevation of n3 is 4/3π, and an elevation of n4 is 2π. It should be noted that, in this disclosure, a sub-range to which the elevations of the plurality of first reference points belong is not limited, provided that the trigonometric function values of the elevations of the plurality of first reference points can cover trigonometric function values at all angles within one of the sub-ranges.

Correspondingly, a value range of the elevation of the location information is 0 to 2π.

As described above, the plurality of first reference points may alternatively be identified by their respective elevation indexes, and conversion may be performed between an elevation of the first reference point and an elevation difference based on an elevation index and an elevation difference between adjacent circles of latitude.

In this disclosure, the plurality of trigonometric function values corresponding to the elevation indexes of the plurality of first reference points may be sine function values or cosine function values.

Optionally, a sine function value corresponding to an elevation index of an $i^{th}$ first reference point meets the following formula (1):

$$\text{sin\_table\_N}(i) = \sin\left(\frac{\pi r_i}{2N'} \times i\right), \tag{1}$$

where i=0, 1, . . . , and N', N'=⌊N/4⌋, and $r_i$ indicates a radius of the first circle of longitude. Optionally, values of i may alternatively be discontinuous within a range of 0 to ⌊N/4⌋−1. For example, i=0, 2, 4, 5, 9, . . . , and N'.

Optionally, a cosine function value corresponding to an elevation index of an $i^{th}$ first reference point meets the following formula (2):

$$\text{cos\_table\_N}(i) = \cos\left(\frac{\pi r_i}{2N'} \times i\right), \tag{2}$$

where i=0, 1, . . . , and N', N'=⌊N/4⌋, and $r_i$ indicates a radius of the first circle of longitude.

The azimuth trigonometric function table includes a plurality of trigonometric function values corresponding to azimuth indexes of a plurality of second reference points. The plurality of second reference points are reference points on a first circle of latitude. A quantity of the plurality of second reference points is not less than ⌊M/4⌋+1, where ⌊ ⌋ indicates rounding down. The first circle of latitude is one of the N circles of latitude.

In this disclosure, any one of the N circles of latitude is selected as the first circle of latitude, and reference points (namely, the plurality of second reference points) used for calculating the azimuth trigonometric function table are selected from the M reference points on the first circle of latitude. Similarly, according to a principle of a trigonometric function, an angle range of 0° (0) to 360° (2π) may be divided into four sub-ranges: 0° (0) to 90° (π/2), 90° (π/2) to 180° (π), 180° (π) to 270° (3π/2), and 270° (3π/2) to 360°

(2π). A trigonometric function value calculated by using any one of the four sub-ranges may be extended to a trigonometric function value within the angle range of 0° (0) to 360° (2π). Therefore, in this disclosure, during selection of the plurality of second reference points, the quantity of the plurality of second reference points is not less than $\lfloor M/4 \rfloor+1$. To be specific, at least a quarter of the M reference points on the first circle of latitude are selected as the plurality of second reference points. Further, azimuths of any two reference points of the selected plurality of second reference points do not overlap during calculation of a trigonometric function value.

Optionally, azimuths of the plurality of second reference points may belong to one of the four sub-ranges. For example, the azimuths of the plurality of second reference points are within the sub-range of 0° (0) to 90° (π/2), or the azimuths of the plurality of second reference points are within the sub-range of 90° (π/2) to 180° (π), or the azimuths of the plurality of second reference points are within the sub-range of 180° (π) to 270° (3π/2), or the azimuths of the plurality of second reference points are within the sub-range of 270° (3π/2) to 360° (2π).

Optionally, the azimuths of the plurality of second reference points may belong to at least two of the four sub-ranges. For example, an azimuth of a first part of the plurality of second reference points is within the sub-range of 0° (0) to 90° (π/2), and an azimuth of a second part of reference points is within the sub-range of 90° (π/2) to 180° (π), where the azimuths of the two parts of reference points do not overlap during calculation of a trigonometric function value, or an azimuth of a first part of the plurality of second reference points is within the sub-range of 90° (π/2) to 180° (π), and an azimuth of a second part of reference points is within the sub-range of 180° (π) to 270° (3π/2), where the azimuths of the two parts of reference points do not overlap during calculation of a trigonometric function value, or an azimuth of a first part of the plurality of second reference points is within the sub-range of 180° (π) to 270° (3π/2), and an azimuth of a second part of reference points is within the sub-range of 270° (3π/2) to 360° (2π), where the azimuths of the two parts of reference points do not overlap during calculation of a trigonometric function value, or an azimuth of a first part of the plurality of second reference points is within the sub-range of 0° (0) to 90° (π/2), an azimuth of a second part of reference points is within the sub-range of 90° (π/2) to 180° (π), and an azimuth of a third part of reference points is within the sub-range of 180° (π) to 270° (3π/2), where the azimuths of the three parts of reference points do not overlap during calculation of a trigonometric function value, or an azimuth of a first part of the plurality of second reference points is within the sub-range of 90° (π/2) to 180° (π), an azimuth of a second part of reference points is within the sub-range of 180° (π) to 270° (3π/2), and an azimuth of a third part of reference points is within the sub-range of 270° (3π/2) to 360° (2π), where the azimuths of the three parts of reference points do not overlap during calculation of a trigonometric function value, or an azimuth of a first part of the plurality of second reference points is within the sub-range of 0° (0) to 90° (π/2), an azimuth of a second part of reference points is within the sub-range of 90° (π/2) to 180° (π), an azimuth of a third part of reference points is within the sub-range of 180° (π) to 270° (3π/2), and an azimuth of a fourth part of reference points is within the sub-range of 270° (3π/2) to 360° (2π), where the azimuths of the four parts of reference points do not overlap during calculation of a trigonometric function value.

The not overlapping may mean that trigonometric function values calculated by using azimuths belonging to different sub-ranges are not equal. For example, there are a total of four second reference points (n1, n2, n3, and n4), where an azimuth of n1 is 0, an azimuth of n2 is π/6, an azimuth of n3 is π/3, and an azimuth of n4 is π/2, or an azimuth of n1 is 0, an azimuth of n2 is 2/3π, an azimuth of n3 is 4/3π, and an azimuth of n4 is 2π. It should be noted that, in this disclosure, a sub-range to which the azimuths of the plurality of second reference points belong is not limited, provided that the trigonometric function values of the azimuths of the plurality of second reference points can cover trigonometric function values at all angles within one of the sub-ranges.

Correspondingly, a value range of the azimuth of the location information is 0 to 2π.

As described above, the plurality of second reference points may alternatively be identified by their respective azimuth indexes, and conversion may be performed between an azimuth of the second reference point and an azimuth difference based on an azimuth index and an azimuth difference between adjacent circles of longitude.

In this disclosure, the plurality of trigonometric function values corresponding to the azimuth indexes of the plurality of second reference points may be sine function values or cosine function values.

Optionally, a sine function value corresponding to an azimuth index of an $i^{th}$ second reference point meets the following formula (3):

$$\text{sin\_table\_M}(j) = \sin\left(\frac{\pi r_j}{2M'} \times j\right), \tag{3}$$

where j=0, 1, . . . , and M', $M'=\lfloor M/4 \rfloor$, and $r_j$ indicates a radius of the first circle of latitude. Optionally, values of j may alternatively be discontinuous within a range of 0 to $\lfloor N/4 \rfloor-1$. For example, i=1, 3, 5, 8, 9, 10, . . . , and M'.

Optionally, a cosine function value corresponding to an azimuth index of an $i^{th}$ second reference point meets the following formula (4):

$$\text{cos\_table\_M}(j) = \cos\left(\frac{\pi r_j}{2M'} \times j\right), \tag{4}$$

where j=0, 1, . . . , and M', $M'=\lfloor M/4 \rfloor$, and $r_j$ indicates a radius of the first circle of latitude.

It should be noted that the elevation trigonometric function table and the azimuth trigonometric function table may be calculated and stored in advance, or may be calculated and stored in real time based on values of M and N. Optionally, because both an encoder and a decoder perform framing, during calculation of the HOA coefficient, when a value of M of a current audio frame is equal to a value of M of a previous audio frame, an azimuth trigonometric function table may not need to be recalculated during processing of the current frame, and an azimuth trigonometric function table of the previous audio frame may be directly used, and when a value of N of the current audio frame is equal to a value of N of the previous audio frame, an elevation trigonometric function table may not need to be recalculated during processing of the current frame, and an elevation trigonometric function table of the previous audio frame may be directly used.

In this disclosure, a trigonometric function value corresponding to the elevation information of the location information of the virtual speaker on the preset spherical surface may be obtained based on the elevation information of the location information and the elevation trigonometric function table, and/or a trigonometric function value corresponding to the azimuth information of the location information of the virtual speaker on the preset spherical surface may be obtained based on the azimuth information of the location information and the azimuth trigonometric function table.

It can be learned that, for the location information of the virtual speaker on the preset spherical surface, the trigonometric function value corresponding to the location information may be obtained based on specific content included in the location information and specific content of the preset reference trigonometric function table. To be specific, the location information includes the elevation information, and the trigonometric function value corresponding to the elevation information of the location information may be obtained based on the elevation information and the reference trigonometric function table (if the elevation trigonometric function table exists, the elevation trigonometric function table is used, or if no elevation trigonometric function table exists, the azimuth trigonometric function table is used), and the location information includes the azimuth information, and the trigonometric function value corresponding to the azimuth information of the location information may be obtained based on the azimuth information and the reference trigonometric function table (if the azimuth trigonometric function table exists, the azimuth trigonometric function table is used, or if no azimuth trigonometric function table exists, the elevation trigonometric function table is used).

In this disclosure, the trigonometric function value corresponding to the elevation information of the location information may be obtained by using the following several methods.

1. When the elevation information of the location information corresponds to an elevation index of a reference point of the plurality of first reference points, a trigonometric function value that is in the elevation trigonometric function table and that corresponds to the elevation index of the reference point is used as the trigonometric function value corresponding to the elevation information of the location information.

That the elevation information of the location information corresponds to an elevation index of a reference point of the plurality of first reference points indicates that the elevation corresponding to the location of the virtual speaker on the preset spherical surface is exactly equal to an elevation corresponding to an elevation index in the elevation trigonometric function table, or the elevation index corresponding to the location of the virtual speaker on the preset spherical surface is exactly equal to an elevation index in the elevation trigonometric function table, to be specific, the location of the virtual speaker on the preset spherical surface coincides with a location of a reference point selected for obtaining the elevation trigonometric function table. Therefore, the trigonometric function value of the elevation information may be directly queried from the elevation trigonometric function table.

2. When the elevation information of the location information corresponds to an elevation index of a reference point of N reference points other than the plurality of first reference points, the elevation index of the reference point of the N reference points other than the plurality of first reference points is converted into an elevation index of a reference point of the plurality of first reference points, and a trigonometric function value that is in the elevation trigonometric function table and that corresponds to the elevation index of the reference point is used as the trigonometric function value corresponding to the elevation information of the location information.

That the elevation information of the location information corresponds to an elevation index of a reference point of N reference points other than the plurality of first reference points indicates that the elevation information corresponding to the location of the virtual speaker on the preset spherical surface is not equal to an elevation corresponding to any elevation index in the elevation trigonometric function table, but is equal to an angle corresponding to an elevation index of another reference point on the first circle of longitude, or the elevation index corresponding to the location of the virtual speaker on the preset spherical surface is equal to an elevation index of another reference point on the first circle of longitude, to be specific, the location of the virtual speaker on the preset spherical surface coincides with a location of a reference point, where the reference point is not used for obtaining the elevation trigonometric function table, but an elevation index of the reference point has a trigonometric function correspondence with an elevation index in the trigonometric function table. Therefore, an elevation index of a reference point of N reference points other than the plurality of first reference points may be converted into an elevation index of a reference point of the plurality of first reference points according to a principle of a trigonometric function, and then a trigonometric function value corresponding to the elevation index of the reference point of the plurality of first reference points is obtained through table lookup, and the trigonometric function value corresponding to the elevation index of the reference point of the plurality of first reference points is used as the trigonometric function value corresponding to the elevation information of the location information.

3. When the elevation information of the location information does not correspond to an elevation index of any reference point, elevation information of a reference point corresponding to the elevation information of the location information is obtained based on the elevation information of the location information, and when the elevation information of the reference point corresponding to the elevation information of the location information corresponds to an elevation index of a reference point of the plurality of first reference points, a trigonometric function value that is in the elevation trigonometric function table and that corresponds to the elevation index of the reference point is used as the trigonometric function value corresponding to the elevation information of the location information, or when the elevation information of the reference point corresponding to the elevation information of the location information corresponds to an elevation index of a reference point of N reference points other than the plurality of first reference points, the elevation index of the reference point of the N reference points other than the plurality of first reference points is converted into an elevation index of a reference point of the plurality of first reference points, and a trigonometric function value that is in the elevation trigonometric function table and that corresponds to the elevation index of the reference point is used as the trigonometric function value corresponding to the elevation information of the location information.

That the elevation information of the location information does not correspond to an elevation index of any reference point indicates that the location of the virtual speaker on the preset spherical surface is neither on a circle of longitude nor on a circle of latitude. Therefore, the elevation information of the reference point corresponding to the elevation information of the location information is first obtained, and then the trigonometric function value corresponding to the elevation information of the reference point is obtained according to the method 1 or the method 2, and the trigonometric function value corresponding to the elevation information of the reference point is used as the trigonometric function value corresponding to the elevation information of the location information.

Optionally, the elevation φ and the elevation index φ' meet the following formula (5):

$$\varphi' = \text{round}\left(\frac{\varphi}{2\pi r_i \times N}\right), \tag{5}$$

where $r_i$ indicates a radius of the first circle of longitude, and round( ) indicates rounding.

In this disclosure, the trigonometric function value corresponding to the azimuth information of the location information may be obtained by using the following several methods.

1. When the azimuth information of the location information corresponds to an azimuth index of a reference point of the plurality of second reference points, a trigonometric function value that is in the azimuth trigonometric function table and that corresponds to the azimuth index of the reference point is used as the trigonometric function value corresponding to the azimuth information of the location information.

That the azimuth information of the location information corresponds to an azimuth index of a reference point of the plurality of second reference points indicates that the azimuth corresponding to the location of the virtual speaker on the preset spherical surface is exactly equal to an azimuth corresponding to an azimuth index in the azimuth trigonometric function table, or the azimuth index corresponding to the location of the virtual speaker on the preset spherical surface is exactly equal to an azimuth index in the azimuth trigonometric function table, to be specific, the location of the virtual speaker on the preset spherical surface coincides with a location of a reference point selected for obtaining the azimuth trigonometric function table. Therefore, the trigonometric function value of the azimuth information may be directly queried from the azimuth trigonometric function table.

2. When the azimuth information of the location information corresponds to an azimuth index of a reference point of M reference points other than the plurality of second reference points, the azimuth index of the reference point of the M reference points other than the plurality of second reference points is converted into an azimuth index of a reference point of the plurality of second reference points, and a trigonometric function value that is in the azimuth trigonometric function table and that corresponds to the azimuth index of the reference point is used as the trigonometric function value corresponding to the azimuth information of the location information.

That the azimuth information of the location information corresponds to an azimuth index of a reference point of M reference points other than the plurality of second reference points indicates that the azimuth information corresponding to the location of the virtual speaker on the preset spherical surface is not equal to an elevation corresponding to any elevation index in the azimuth trigonometric function table, but is equal to an angle corresponding to an azimuth index of another reference point on the first circle of latitude, or the azimuth index corresponding to the location of the virtual speaker on the preset spherical surface is equal to an azimuth index of another reference point on the first circle of latitude, to be specific, the location of the virtual speaker on the preset spherical surface coincides with a location of a reference point, where the reference point is not used for obtaining the azimuth trigonometric function table, but an azimuth index of the reference point has a trigonometric function correspondence with an azimuth index in the trigonometric function table. Therefore, an azimuth index of a reference point of M reference points other than the plurality of second reference points may be converted into an azimuth index of a reference point of the plurality of second reference points according to a principle of a trigonometric function, and then a trigonometric function value corresponding to the azimuth index of the reference point of the plurality of second reference points is obtained through table lookup, and the trigonometric function value corresponding to the azimuth index of the reference point of the plurality of second reference points is used as the trigonometric function value corresponding to the azimuth information of the location information.

3. When the azimuth information of the location information does not correspond to an azimuth index of any reference point, azimuth information of a reference point corresponding to the azimuth information of the location information is obtained based on the azimuth information of the location information, and when the azimuth information of the reference point corresponding to the azimuth information of the location information corresponds to an azimuth index of a reference point of the plurality of second reference points, a trigonometric function value that is in the azimuth trigonometric function table and that corresponds to the azimuth index of the reference point is used as the trigonometric function value corresponding to the azimuth information of the location information, or when the azimuth information of the reference point corresponding to the azimuth information of the location information corresponds to an azimuth index of a reference point of M reference points other than the plurality of second reference points, the azimuth index of the reference point of the M reference points other than the plurality of second reference points is converted into an azimuth index of a reference point of the plurality of second reference points, and a trigonometric function value that is in the azimuth trigonometric function table and that corresponds to the azimuth index of the reference point is used as the trigonometric function value corresponding to the azimuth information of the location information.

That the azimuth information of the location information does not correspond to an azimuth index of any reference point indicates that the location of the virtual speaker on the preset spherical surface is neither on a circle of longitude nor on a circle of latitude. Therefore, the azimuth information of the reference point corresponding to the azimuth information of the location information is first obtained, and then the trigonometric function value corresponding to the azimuth information of the reference point is obtained according to the method 1 or the method 2, and the trigonometric function value corresponding to the azimuth information of the reference point is used as the trigonometric function value corresponding to the azimuth information of the location information.

Optionally, the azimuth θ and the azimuth index θ' meet the following formula (6):

$$\theta' = \text{round}\left(\frac{\theta}{2\pi r_j \times M}\right), \quad (6)$$

where $r_j$ indicates a radius of the first circle of latitude, and round( ) indicates rounding.

Step 403: Obtain an HOA coefficient for the virtual speaker based on the trigonometric function value corresponding to the location information.

The following describes a process of generating the HOA coefficient for the virtual speaker.

When a sound wave is transmitted in an ideal medium, a wave velocity of the sound wave is as follows: k=w/c, where the angular frequency w is equal to 2πf, f indicates a frequency of the sound wave, and c indicates a sound velocity. Therefore, sound pressure p meets the following formula (7):

$$\nabla^2 p + k^2 p = 0, \quad (7)$$

Where $\nabla^2$ is a Laplace operator.

The following formula (8) may be obtained for the sound pressure p by solving the formula (7) in spherical coordinates:

$$p(r, \theta, \varphi, k) = s\Sigma_{m=0}^{\infty}(2m+1)j^m j_m^{kr}(kr)\Sigma_{0\le n\le m,\sigma=\pm1} Y_{m,n}^{\sigma}(\theta_s, \varphi_s) Y_{m,n}^{\sigma}(\theta, \varphi), \quad (8)$$

where r indicates a radius of a sphere, θ indicates an azimuth, φ indicates an elevation, k indicates a wave velocity, s indicates an amplitude of an ideal planar wave, m indicates a sequence number of an HOA order, $$j^m j_m^{kr}(kr)$$

indicates a spherical Bessel function, also referred to as a radial basis function, where the 1st j is an imaginary unit, $$(2m+1)j^m j_m^{kr}(kr)$$

does not change with an angle, $$Y_{m,n}^{\sigma}(\theta, \varphi)$$

is a spherical harmonic function corresponding to θ and φ, and $$Y_{m,n}^{\sigma}(\theta_s, \varphi_s)$$

is a spherical harmonic function in a sound source direction.

An ambisonics (Ambisonics) coefficient is as follows:

$$B_{m,n}^{\sigma} = s \cdot Y_{m,n}^{\sigma}(\theta_s, \varphi_s) \quad (9)$$

Therefore, a general expansion form (10) for the sound pressure p may be obtained:

$$p(r, \theta, \varphi, k) = \Sigma_{m=0}^{\infty} j^m j_m^{kr}(kr)\Sigma_{0\le n\le m,\sigma=\pm1} B_{m,n}^{\sigma} Y_{m,n}^{\sigma}(\theta, \varphi) \quad (10)$$

The formula (9) may indicate that a sound field may be expanded on a spherical surface based on a spherical harmonic function, and the sound field is represented by an ambisonics coefficient.

Correspondingly, if the ambisonics coefficient is known, the sound field may be reconstructed. The formula (9) is truncated to an $N^{th}$ item, and the ambisonics coefficient is used as an approximate description of the sound field, and therefore is referred to as an $N^{th}$-order HOA coefficient. The HOA coefficient is also referred to as an ambisonics coefficient. The $N^{th}$-order ambisonics coefficient has a total of $(N+1)^2$ channels. Optionally, an HOA order may range from a $2^{nd}$ order to a $10^{th}$ order. A spatial sound field at a moment corresponding to a sampling point of an HOA signal can be reconstructed by superposing spherical harmonic functions based on a coefficient corresponding to the sampling point. The HOA coefficient for the virtual speaker may be generated according to this principle. $\theta_s$ and $\varphi_s$ in the formula (9) are respectively set to the location information, namely, the azimuth and the elevation, of the virtual speaker. The HOA coefficient, also referred to as an ambisonics coefficient, for the virtual speaker may be obtained based on the formula (9). For example, for a $3^{rd}$-order HOA signal, assuming that s=1, a 16-channel HOA coefficient corresponding to the $3^{rd}$-order HOA signal may be obtained based on the spherical harmonic function $$Y_{m,n}^{\sigma}(\theta_s, \varphi_s).$$

A calculation formula for the 16-channel HOA coefficient corresponding to the $3^{rd}$-order HOA signal is shown in Table 1.

TABLE 1

| m | n | Expression of HOA coefficient in polar coordinates |
|---|---|---|
| 0 | 0 | $\frac{1}{2\sqrt{\pi}}$ |
| 1 | 0 | $\frac{1}{2}\sqrt{\frac{3}{\pi}}\cos\theta$ |
| | +1 | $\frac{1}{2}\sqrt{\frac{3}{\pi}}\sin\theta\cos\varphi$ |
| | −1 | $\frac{1}{2}\sqrt{\frac{3}{\pi}}\sin\theta\sin\varphi$ |
| 2 | 0 | $\frac{1}{4}\sqrt{\frac{5}{\pi}}(3\cos^2\theta - 1)$ |
| | +1 | $\frac{1}{2}\sqrt{\frac{15}{\pi}}\sin\theta\cos\theta\cos\varphi$ |
| | −1 | $\frac{1}{2}\sqrt{\frac{15}{\pi}}\sin\theta\cos\theta\sin\varphi$ |

TABLE 1-continued

| m | n | Expression of HOA coefficient in polar coordinates |
|---|---|---|
| | +2 | $\frac{1}{4}\sqrt{\frac{15}{\pi}}\sin^2\theta\cos 2\varphi$ |
| | −2 | $\frac{1}{4}\sqrt{\frac{15}{\pi}}\sin^2\theta\sin 2\varphi$ |
| 3 | 0 | $\frac{1}{4}\sqrt{\frac{7}{\pi}}(5\cos^3\theta-3\cos\theta)$ |
| | +1 | $\frac{1}{4}\sqrt{\frac{21}{2\pi}}(5\cos^2\theta-1)\sin\theta\cos\varphi$ |
| | −1 | $\frac{1}{4}\sqrt{\frac{21}{2\pi}}(5\cos^2\theta-1)\sin\theta\sin\varphi$ |
| | +2 | $\frac{1}{4}\sqrt{\frac{105}{\pi}}\cos\theta\sin^2\theta\cos 2\varphi$ |
| | −2 | $\frac{1}{4}\sqrt{\frac{105}{\pi}}\cos\theta\sin^2\theta\sin 2\varphi$ |
| | +3 | $\frac{1}{4}\sqrt{\frac{35}{\pi}}\sin^3\theta\cos 3\varphi$ |
| | −3 | $\frac{1}{4}\sqrt{\frac{35}{\pi}}\sin^3\theta\sin 3\varphi$ |

In Table 1, 0 indicates the azimuth information of the location information of the virtual speaker on the preset spherical surface, φ indicates the elevation information of the location information of the virtual speaker on the preset spherical surface, m indicates an HOA order, m=0, 1 . . . N, n indicates a direction parameter at each order, and n=−3, . . . 3. Based on the expression in the polar coordinates in Table 1, a 16-channel HOA coefficient corresponding to a $3^{rd}$-order HOA signal of the virtual speaker may be obtained based on the location information of the virtual speaker. In addition, the method of the present disclosure may also be used to obtain an HOA coefficient of any order that is obtained through expansion of a spherical harmonic function.

In this disclosure, only trigonometric function values (an elevation trigonometric function table) of a quarter of all reference points on a circle of longitude on the preset spherical surface and/or trigonometric function values (an azimuth trigonometric function table) of a quarter of all reference points on a circle of latitude on the preset spherical surface need to be pre-obtained, and trigonometric function values at any angles ranging from 0° to 360° may be obtained based on the trigonometric function table. Other trigonometric functions such as a power trigonometric function and a multiple-angle trigonometric function in Table 1 may be expanded in the conventional technology, to obtain a general expansion form including a sin trigonometric function and a cos trigonometric function, and then other corresponding trigonometric function values may be obtained by using the method of the present disclosure. In this way, an amount of calculation in a preliminary stage can be reduced. In addition, because a quantity of angles in the trigonometric function table is reduced, an amount of data, that needs to be stored, of the trigonometric function table is also correspondingly reduced, so that storage space can be saved.

Several specific embodiments are used below as examples to describe a method for obtaining trigonometric function values respectively corresponding to elevation information and azimuth information of location information. φ indicates the elevation information of the location information, or indicates elevation information of a reference point corresponding to the location information. φ' indicates an elevation index. θ indicates the azimuth information of the location information, or indicates azimuth information of a reference point corresponding to the location information. θ' indicates an azimuth index.

It should be noted that, in this disclosure, the elevation information and the azimuth information may be represented by index numbers. For example, there are N reference points on a circle of longitude, the N reference points are arranged at equal spacings, and a difference between elevation information of two adjacent reference points is 2π/N. Therefore, elevation information of each of the N reference points may be represented by an index number of the reference point, that is, elevation information of the N reference points may be represented as 0 to N−1. If a quantity of a plurality of first reference points is $\lfloor N/4\rfloor+1$, elevation information of the plurality of first reference points may be represented as 0 to $\lfloor N/4\rfloor$. Similarly, there are M reference points on a circle of latitude, the M reference points are arranged at equal spacings, and a difference between azimuth information of two adjacent reference points is 2π/M. Therefore, azimuth information of each of the M reference points may be represented by an index number of the reference point, that is, azimuth information of the M reference points may be represented as 0 to M−1. If a quantity of a plurality of second reference points is $\lfloor M/4\rfloor+1$, azimuth information of the plurality of second reference points may be represented as 0 to $\lfloor M/4\rfloor$ In this disclosure, a relationship between the elevation φ and the elevation index φ' may be obtained by using the formula (5), and a relationship between the azimuth θ and the azimuth index θ' may be obtained by using the formula (6).

Embodiment 1

M≠N, and an elevation sine function table sin_table_N and an azimuth sine function table sin_table_M are preset by using the method in step 402.

A sine function value and a cosine function value corresponding to elevation information of location information may be obtained according to the following rules:

$$\sin(\varphi)=\text{sin\_table\_N}(\varphi')$$
$$\varphi'<\lfloor N/4\rfloor$$
$$\sin(\varphi)=\text{sin\_table\_N}(N/2-\varphi')$$
$$\lfloor N/4\rfloor\le\varphi'<\lfloor N/2\rfloor$$
$$\sin(\varphi)=-\text{sin\_table\_N}(\varphi'-N/2)$$
$$\lfloor N/2\rfloor\le\varphi'<\lfloor 3N/4\rfloor$$
$$\sin(\varphi)=-\text{sin\_table\_N}(N-\varphi')$$
$$\lfloor 3N/4\rfloor\le\varphi'<N$$
$$\cos(\varphi)=\text{sin\_table\_N}(N/4-\varphi')$$
$$\varphi'<\lfloor N/4\rfloor$$
$$\cos(\varphi)=-\text{sin\_table\_N}(\varphi'-N/4)$$
$$\lfloor N/4\rfloor\le\varphi'<\lfloor N/2\rfloor$$

-continued $$\cos(\varphi) = -\text{sin\_table\_N}(3N/4 - \varphi') \quad \lfloor N/2 \rfloor \le \varphi' < \lfloor 3N/4 \rfloor$$

$$\cos(\varphi) = \text{sin\_table\_N}(\varphi' - 3N/4) \quad \lfloor 3N/4 \rfloor \le \varphi' < N$$

A sine function value and a cosine function value corresponding to azimuth information of the location information may be obtained according to the following rules:

$$\sin(\theta) = \text{sin\_table\_M}(\theta') \quad \theta' < \lfloor M/4 \rfloor$$

$$\sin(\theta) = \text{sin\_table\_M}(M/2 - \theta') \quad \lfloor M/4 \rfloor \le \theta' < \lfloor M/2 \rfloor$$

$$\sin(\theta) = -\text{sin\_table\_M}(\theta' - M/2) \quad \lfloor M/2 \rfloor \le \theta' < \lfloor 3M/4 \rfloor$$

$$\sin(\theta) = -\text{sin\_table\_M}(M - \theta') \quad \lfloor 3M/4 \rfloor \le \theta' < M$$

$$\cos(\theta) = \text{sin\_table\_M}(M/4 - \theta') \quad \theta' < \lfloor M/4 \rfloor$$

$$\cos(\theta) = -\text{sin\_table\_M}(\theta' - M/4) \quad \lfloor M/4 \rfloor \le \theta' < \lfloor M/2 \rfloor$$

$$\cos(\theta) = -\text{sin\_table\_M}(3M/4 - \theta') \quad \lfloor M/2 \rfloor \le \theta' < \lfloor 3M/4 \rfloor$$

$$\cos(\theta) = \text{sin\_table\_M}(\theta' - 3M/4) \quad \lfloor 3M/4 \rfloor \le \theta' < M$$

Embodiment 2

M=N, and an elevation sine function table sin_table_N is preset by using the method in step 402. Because M is equal to N, an azimuth sine function table sin_table_M is the same as the elevation sine function table sin_table_N. In this embodiment, only one trigonometric function table, for example, sin_table, may be obtained. This can further reduce an amount of calculation and an amount of storage for a trigonometric function table, and save storage space.

A sine function value and a cosine function value corresponding to elevation information of location information may be obtained according to the following rules:

$$\sin(\varphi) = \text{sin\_table}(\varphi') \quad \varphi' < \lfloor N/4 \rfloor$$

$$\sin(\varphi) = \text{sin\_table}(N/2 - \varphi') \quad \lfloor N/4 \rfloor \le \varphi' < \lfloor N/2 \rfloor$$

$$\sin(\varphi) = -\text{sin\_table}(\varphi' - N/2) \quad \lfloor N/2 \rfloor \le \varphi' < \lfloor 3N/4 \rfloor$$

$$\sin(\varphi) = -\text{sin\_table}(N - \varphi') \quad \lfloor 3N/4 \rfloor \le \varphi' < N$$

-continued $$\cos(\varphi) = \text{sin\_table}(N/4 - \varphi') \quad \varphi' < \lfloor N/4 \rfloor$$

$$\cos(\varphi) = -\text{sin\_table}(\varphi' - N/4) \quad \lfloor N/4 \rfloor \le \varphi' < \lfloor N/2 \rfloor$$

$$\cos(\varphi) = -\text{sin\_table}(3N/4 - \varphi') \quad \lfloor N/2 \rfloor \le \varphi' < \lfloor 3N/4 \rfloor$$

$$\cos(\varphi) = \text{sin\_table}(\varphi' - 3N/4) \quad \lfloor 3N/4 \rfloor \le \varphi' < N$$

A sine function value and a cosine function value corresponding to azimuth information of the location information may be obtained according to the following rules:

$$\sin(\theta) = \text{sin\_table}(\theta') \quad \theta' < \lfloor N/4 \rfloor$$

$$\sin(\theta) = \text{sin\_table}(N/2 - \theta') \quad \lfloor N/4 \rfloor \le \theta' < \lfloor N/2 \rfloor$$

$$\sin(\theta) = -\text{sin\_table}(\theta' - N/2) \quad \lfloor N/2 \rfloor \le \theta' < \lfloor 3N/4 \rfloor$$

$$\sin(\theta) = -\text{sin\_table}(N - \theta') \quad \lfloor 3N/4 \rfloor \le \theta' < N$$

$$\cos(\theta) = \text{sin\_table}(N/4 - \theta') \quad \theta' < \lfloor N/4 \rfloor$$

$$\cos(\theta) = -\text{sin\_table}(\theta' - N/4) \quad \lfloor N/4 \rfloor \le \theta' < \lfloor N/2 \rfloor$$

$$\cos(\theta) = -\text{sin\_table}(3N/4 - \theta') \quad \lfloor N/2 \rfloor \le \theta' < \lfloor 3N/4 \rfloor$$

$$\cos(\theta) = \text{sin\_table}(\theta' - 3N/4) \quad \lfloor 3N/4 \rfloor \le \theta' < N$$

Embodiment 3

M≠N, M=K1×N, K1≥2, and an azimuth sine function table sin_table_M is preset by using the method in step 402. Because M and N have a multiple relationship, an elevation sine function table sin_table_N may be obtained based on the multiple relationship in combination with a principle of a trigonometric function. Therefore, in this embodiment, only one trigonometric function table, for example, sin_table_M, may be obtained. This can further reduce an amount of calculation and an amount of storage for a trigonometric function table, and save storage space.

A sine function value and a cosine function value corresponding to azimuth information of location information may be obtained according to the following rules:

$$\sin(\theta) = \text{sin\_table\_M}(\theta') \quad \theta' < \lfloor M/4 \rfloor$$

-continued $$\sin(\theta) = \text{sin\_table\_M}(M/2 - \theta') \quad \lfloor M/4 \rfloor \le \theta' < \lfloor M/2 \rfloor$$

$$\sin(\theta) = -\text{sin\_table\_M}(\theta' - M/2) \quad \lfloor M/2 \rfloor \le \theta' < \lfloor 3M/4 \rfloor$$

$$\sin(\theta) = -\text{sin\_table\_M}(M - \theta') \quad \lfloor 3M/4 \rfloor \le \theta' < M$$

$$\cos(\theta) = \text{sin\_table\_M}(M/4 - \theta') \quad \theta' < \lfloor M/4 \rfloor$$

$$\cos(\theta) = -\text{sin\_table\_M}(\theta' - M/4) \quad \lfloor M/4 \rfloor \le \theta' < \lfloor M/2 \rfloor$$

$$\cos(\theta) = -\text{sin\_table\_M}(3M/4 - \theta') \quad \lfloor M/2 \rfloor \le \theta' < \lfloor 3M/4 \rfloor$$

$$\cos(\theta) = \text{sin\_table\_M}(\theta' - 3M/4) \quad \lfloor 3M/4 \rfloor \le \theta' < M$$

A sine function value and a cosine function value corresponding to elevation information of the location information may be obtained according to the following rules:

$$\sin(\varphi) = \text{sin\_table\_M}(K1 \times \varphi') \quad K1 \times \varphi' < \lfloor M/4 \rfloor$$

$$\sin(\varphi) = \text{sin\_table\_M}(M/2 - K1 \times \varphi') \quad \lfloor M/4 \rfloor \le K1 \times \varphi' < \lfloor M/2 \rfloor$$

$$\sin(\varphi) = -\text{sin\_table\_M}(K1 \times \varphi' - M/2) \quad \lfloor M/2 \rfloor \le K1 \times \varphi' < \lfloor 3M/4 \rfloor$$

$$\sin(\varphi) = -\text{sin\_table\_M}(M - K1 \times \varphi') \quad \lfloor 3M/4 \rfloor \le K1 \times \varphi' < M$$

$$\cos(\varphi) = \text{sin\_table\_M}(M/4 - K1 \times \varphi') \quad K1 \times \varphi' < \lfloor M/4 \rfloor$$

$$\cos(\varphi) = -\text{sin\_table\_M}(K1 \times \varphi' - M/4) \quad \lfloor M/4 \rfloor \le K1 \times \varphi' < \lfloor M/2 \rfloor$$

$$\cos(\varphi) = -\text{sin\_table\_M}(3M/4 - K1 \times \varphi') \quad \lfloor M/2 \rfloor \le K1 \times \varphi' < \lfloor 3M/4 \rfloor$$

$$\cos(\varphi) = \text{sin\_table\_M}(K1 \times \varphi' - 3M/4) \quad \lfloor 3M/4 \rfloor \le K1 \times \varphi' < M$$

Embodiment 4

M≠N, N=K2×M, K2≥2, and an elevation sine function table sin_table_N is preset by using the method in step 402. Because M and N have a multiple relationship, an azimuth sine function table sin_table_M may be obtained based on the multiple relationship in combination with a principle of a trigonometric function. Therefore, in this embodiment, only one trigonometric function table, for example, sin_table_N, may be obtained. This can further reduce an amount of calculation and an amount of storage for a trigonometric function table, and save storage space.

A sine function value and a cosine function value corresponding to elevation information of location information may be obtained according to the following rules:

$$\sin(\varphi) = \text{sin\_table\_N}(\varphi') \quad \varphi' < \lfloor N/4 \rfloor$$

$$\sin(\varphi) = \text{sin\_table\_N}(N/2 - \varphi') \quad \lfloor N/4 \rfloor \le \varphi' < \lfloor N/2 \rfloor$$

$$\sin(\varphi) = -\text{sin\_table\_N}(\varphi' - N/2) \quad \lfloor N/2 \rfloor \le \varphi' < \lfloor 3N/4 \rfloor$$

$$\sin(\varphi) = -\text{sin\_table\_N}(N - \varphi') \quad \lfloor 3N/4 \rfloor \le \varphi' < N$$

$$\cos(\varphi) = \text{sin\_table\_N}(N/4 - \varphi') \quad \varphi' < N/4$$

$$\cos(\varphi) = -\text{sin\_table\_N}(\varphi' - N/4) \quad \lfloor N/4 \rfloor \le \varphi' < \lfloor N/2 \rfloor$$

$$\cos(\varphi) = -\text{sin\_table\_N}(3N/4 - \varphi') \quad \lfloor N/2 \rfloor \le \varphi' < \lfloor 3N/4 \rfloor$$

$$\cos(\varphi) = \text{sin\_table\_N}(\varphi' - 3N/4) \quad \lfloor 3N/4 \rfloor \le \varphi' < N$$

A sine function value and a cosine function value corresponding to azimuth information of the location information may be obtained according to the following rules:

$$\sin(\theta) = \text{sin\_table\_N}(K2 \times \theta') \quad K2 \times \theta' < \lfloor N/4 \rfloor$$

$$\sin(\theta) = \text{sin\_table\_N}(N/2 - K2 \times (\theta') \quad \lfloor N/4 \rfloor \le K2 \times \theta' < \lfloor N/2 \rfloor$$

$$\sin(\theta) = -\text{sin\_table\_N}(K2 \times \theta' - N/2) \quad \lfloor N/2 \rfloor \le K2 \times \theta' < \lfloor 3N/4 \rfloor$$

$$\sin(\theta) = -\text{sin\_table\_N}(K2 \times \theta' - B/2) \quad \lfloor 3N/4 \rfloor \le K2 \times \theta' < N$$

$$\cos(\theta) = \text{sin\_table\_N}(N/4 - K2 \times \theta') \quad K2 \times \theta' < \lfloor N/4 \rfloor$$

$$\cos(\theta) = -\text{sin\_table\_N}(K2 \times \theta' - N/4) \quad \lfloor N/4 \rfloor \le K2 \times \theta' < \lfloor N/2 \rfloor$$

$$\cos(\theta) = -\text{sin\_table\_N}(3N/4 - K2 \times \theta') \quad \lfloor N/2 \rfloor \le K2 \times \theta' < \lfloor 3N/4 \rfloor$$

$$\cos(\theta) = \text{sin\_table\_N}(K2 \times \theta' - 3N/4) \quad \lfloor 3N/4 \rfloor \le K2 \times \theta' < \lfloor N/4 \rfloor$$

Embodiment 5

M≠N, and an elevation cosine function table cos_table_N and an azimuth cosine function table cos_table_M are preset by using the method in step 402.

A sine function value and a cosine function value corresponding to elevation information of location information may be obtained according to the following rules:

$$\sin(\theta) = \text{cos\_table\_N}(N/4 - \theta') \quad \theta' < \lfloor N/4 \rfloor$$

$$\sin(\theta) = \text{cos\_table\_N}(\theta' - N/4) \quad \lfloor N/4 \rfloor \le \theta' < \lfloor N/2 \rfloor$$

$$\sin(\theta) = -\text{cos\_table\_N}(3N/4 - \theta') \quad \lfloor N/2 \rfloor \le \theta' < \lfloor 3N/4 \rfloor$$

$$\sin(\theta) = -\text{cos\_table\_N}(\theta' - 3N/4) \quad \lfloor 3N/4 \rfloor \le \theta' < N$$

$$\cos(\theta) = \text{cos\_table\_N}(\theta') \quad \theta' < \lfloor N/4 \rfloor$$

$$\cos(\theta) = -\text{cos\_table\_N}(N/2 - \theta') \quad \lfloor N/4 \rfloor \le \theta' < \lfloor N/2 \rfloor$$

$$\cos(\theta) = -\text{cos\_table\_N}(\theta' - N/2) \quad \lfloor N/2 \rfloor \le \theta' < \lfloor 3N/4 \rfloor$$

$$\cos(\theta) = \text{cos\_table\_N}(N - \theta') \quad \lfloor 3N/4 \rfloor \le \theta' < N$$

A sine function value and a cosine function value corresponding to azimuth information of the location information may be obtained according to the following rules:

$$\sin(\theta) = \text{cos\_table\_M}(M/4 - \theta') \quad \theta' < \lfloor M/4 \rfloor$$

-continued $$\sin(\theta)=\cos\_table\_M(\theta'-M/4)\quad \lfloor M/4\rfloor\le\theta'<\lfloor M/2\rfloor$$
$$\sin(\theta)=-\cos\_table\_M(3M/4-\theta')\quad \lfloor M/2\rfloor\le\theta'<\lfloor 3M/4\rfloor$$
$$\sin(\theta)=-\cos\_table\_M(\theta'-3M/4)\quad \lfloor 3M/4\rfloor\le\theta'<M$$
$$\cos(\theta)=\cos\_table\_M(\theta')\quad \theta'<\lfloor M/4\rfloor$$
$$\cos(\theta)=-\cos\_table\_M(M/2-\theta')\quad \lfloor M/4\rfloor\le\theta'<\lfloor M/2\rfloor$$
$$\cos(\theta)=-\cos\_table\_M(\theta'-M/2)\quad \lfloor M/2\rfloor\le\theta'<\lfloor 3M/4\rfloor$$
$$\cos(\theta)=\cos\_table\_M(M-\theta')\quad \lfloor 3M/4\rfloor\le\theta'<M$$

Figure 7:
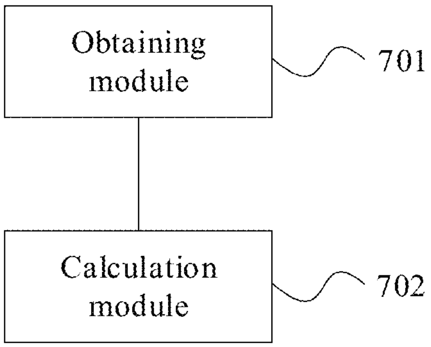
FIG. 7 is a diagram of an example structure of an apparatus for obtaining an HOA coefficient according to this disclosure.

FIG. 7 is a diagram of an example structure of an apparatus for obtaining an HOA coefficient according to this disclosure. As shown in FIG. 7, the apparatus may be used in the encoder 20 or the decoder 30 in the foregoing embodiments. The apparatus for obtaining an HOA coefficient in this embodiment may include an obtaining module 701 and a calculation module 702.

The obtaining module 701 is configured to obtain location information of a virtual speaker on a preset spherical surface, where the location information includes elevation information and/or azimuth information, the preset spherical surface includes M circles of longitude and N circles of latitude, an intersection between the circle of longitude and the circle of latitude is referred to as a reference point, N reference points located on one circle of longitude are arranged at equal spacings, and M reference points located on one circle of latitude are arranged at equal spacings. The calculation module 702 is configured to obtain, based on the location information and a preset reference trigonometric function table, a trigonometric function value corresponding to the location information, where the reference trigonometric function table includes an elevation trigonometric function table and/or an azimuth trigonometric function table, the elevation trigonometric function table includes a plurality of trigonometric function values corresponding to elevation indexes of a plurality of first reference points, the plurality of first reference points are reference points on a first circle of longitude, a quantity of the plurality of first reference points is not less than $\lfloor N/4\rfloor+1$, $\lfloor\ \rfloor$ indicates rounding down, the first circle of longitude is one of the M circles of longitude, the azimuth trigonometric function table includes a plurality of trigonometric function values corresponding to azimuth indexes of a plurality of second reference points, the plurality of second reference points are reference points on a first circle of latitude, a quantity of the plurality of second reference points is not less than $\lfloor M/4\rfloor+1$, and the first circle of latitude is one of the N circles of latitude, and obtain an HOA coefficient for the virtual speaker based on the trigonometric function value corresponding to the location information.

In a possible implementation, the calculation module 702 is further configured to obtain, based on the elevation information of the location information and the elevation trigonometric function table, a trigonometric function value corresponding to the elevation information of the location information, and/or obtain, based on the azimuth information of the location information and the azimuth trigonometric function table, a trigonometric function value corresponding to the azimuth information of the location information.

In a possible implementation, the calculation module is further configured to, when the elevation information of the location information corresponds to an elevation index of a reference point of the plurality of first reference points, use, as the trigonometric function value corresponding to the elevation information of the location information, a trigonometric function value that is in the elevation trigonometric function table and that corresponds to the elevation index of the reference point, or when the elevation information of the location information corresponds to an elevation index of a reference point of N reference points other than the plurality of first reference points, convert the elevation index of the reference point of the N reference points other than the plurality of first reference points into an elevation index of a reference point of the plurality of first reference points, and use, as the trigonometric function value corresponding to the elevation information of the location information, a trigonometric function value that is in the elevation trigonometric function table and that corresponds to the elevation index of the reference point, or when the elevation information of the location information does not correspond to an elevation index of any reference point, obtain, based on the elevation information of the location information, elevation information of a reference point corresponding to the elevation information of the location information, and when the elevation information of the reference point corresponding to the elevation information of the location information corresponds to an elevation index of a reference point of the plurality of first reference points, use, as the trigonometric function value corresponding to the elevation information of the location information, a trigonometric function value that is in the elevation trigonometric function table and that corresponds to the elevation index of the reference point, or when the elevation information of the reference point corresponding to the elevation information of the location information corresponds to an elevation index of a reference point of N reference points other than the plurality of first reference points, convert the elevation index of the reference point of the N reference points other than the plurality of first reference points into an elevation index of a reference point of the plurality of first reference points, and use, as the trigonometric function value corresponding to the elevation information of the location information, a trigonometric function value that is in the elevation trigonometric function table and that corresponds to the elevation index of the reference point.

In a possible implementation, the calculation module is further configured to, when the azimuth information of the location information corresponds to an azimuth index of a reference point of the plurality of second reference points, use, as the trigonometric function value corresponding to the azimuth information of the location information, a trigonometric function value that is in the azimuth trigonometric function table and that corresponds to the azimuth index of the reference point, or when the azimuth information of the location information corresponds to an azimuth index of a reference point of M reference points other than the plurality of second reference points, convert the azimuth index of the reference point of the M reference points other than the plurality of second reference points into an azimuth index of a reference point of the plurality of second reference points, and use, as the trigonometric function value corresponding to the azimuth information of the location information, a trigonometric function value that is in the azimuth trigonometric function table and that corresponds to the azimuth index of the reference point, or when the azimuth information of the location information does not correspond to an azimuth index of any reference point, obtain, based on the azimuth information of the location information, azimuth information of a reference point corresponding to the azimuth information of the location information, and when the azimuth information of the reference point corresponding to the azimuth information of the location information corresponds to an azimuth index of a reference point of the plurality of second reference points, use, as the trigonometric function value corresponding to the azimuth information of the location information, a trigonometric function value that is in the azimuth trigonometric function table and that corresponds to the azimuth index of the reference point, or when the azimuth information of the reference point corresponding to the azimuth information of the location information corresponds to an azimuth index of a reference point of M reference points other than the plurality of second reference points, convert the azimuth index of the reference point of the M reference points other than the plurality of second reference points into an azimuth index of a reference point of the plurality of second reference points, and use, as the trigonometric function value corresponding to the azimuth information of the location information, a trigonometric function value that is in the azimuth trigonometric function table and that corresponds to the azimuth index of the reference point.

In a possible implementation, the elevation information of the location information includes an elevation of the location information or an elevation index of the location information, and the azimuth information of the location information includes an azimuth of the location information or an azimuth index of the location information.

In a possible implementation, the trigonometric function value is a sine function value or a cosine function value.

In a possible implementation, when the plurality of trigonometric function values corresponding to the elevation indexes of the plurality of first reference points are sine function values, a sine function value corresponding to an elevation index of an $i^{th}$ first reference point meets the following formula (1):

$$\text{sin\_table\_N}(i) = \sin\left(\frac{\pi r_i}{2N'} \times i\right), \tag{1}$$

where i=0, 1, . . . , and N', N'=⌊N/4⌋, and $r_i$ indicates a radius of the first circle of longitude, or when the plurality of trigonometric function values corresponding to the elevation indexes of the plurality of first reference points are cosine function values, a cosine function value corresponding to an elevation index of an $i^{th}$ first reference point meets the following formula (2):

$$\text{cos\_table\_N}(i) = \cos\left(\frac{\pi r_i}{2N'} \times i\right), \tag{2}$$

where i=0, 1, . . . , and N', N'=⌊N/4⌋, and $r_i$ indicates a radius of the first circle of longitude.

In a possible implementation, when the plurality of trigonometric function values corresponding to the azimuth indexes of the plurality of second reference points are sine function values, a sine function value corresponding to an azimuth index of a $j^{th}$ second reference point meets the following formula (3):

$$\text{sin\_table\_M}(j) = \sin\left(\frac{\pi r_j}{2M'} \times j\right), \tag{3}$$

where j=0, 1, . . . , and M', M'=⌊M/4⌋, and $r_j$ indicates a radius of the first circle of latitude, or when the plurality of trigonometric function values corresponding to the azimuth indexes of the plurality of second reference points are cosine function values, a cosine function value corresponding to an azimuth index of a $j^{th}$ second reference point meets the following formula (4):

$$\text{cos\_table\_M}(j) = \cos\left(\frac{\pi r_j}{2M'} \times j\right), \tag{4}$$

where j=0, 1, . . . , and M', M'=⌊M/4⌋, and $r_j$ indicates a radius of the first circle of latitude.

In a possible implementation, the elevation φ and the elevation index φ' meet the following formula (5):

$$\varphi' = \text{round}\left(\frac{\varphi}{2\pi r_i \times N}\right), \tag{5}$$

where $r_i$ indicates a radius of the first circle of longitude, and round( ) indicates rounding.

In a possible implementation, the azimuth θ and the azimuth index θ' meet the following formula (6):

$$\theta' = \text{round}\left(\frac{\theta}{2\pi r_j \times M}\right), \tag{6}$$

where $r_j$ indicates a radius of the first circle of latitude, and round( ) indicates rounding.

In a possible implementation, when M≠N, the trigonometric function value corresponding to the elevation information of the location information meets the following formulas:

$$\begin{aligned}
&\sin(\varphi) = \text{sin\_table\_N}(\varphi') && \varphi' < \lfloor N/4 \rfloor\\
&\sin(\varphi) = \text{sin\_table\_N}(N/2 - \varphi') && \lfloor N/4 \rfloor \le \varphi' < \lfloor N/2 \rfloor\\
&\sin(\varphi) = -\text{sin\_table\_N}(\varphi' - N/2) && \lfloor N/2 \rfloor \le \varphi' < \lfloor 3N/4 \rfloor\\
&\sin(\varphi) = -\text{sin\_table\_N}(N - \varphi') && \lfloor 3N/4 \rfloor \le \varphi' < N\\
&\cos(\varphi) = \text{sin\_table\_N}(N/4 - \varphi') && \varphi' < N/4\\
&\cos(\varphi) = -\text{sin\_table\_N}(\varphi' - N/4) && \lfloor N/4 \rfloor \le \varphi' < \lfloor N/2 \rfloor\\
&\cos(\varphi) = -\text{sin\_table\_N}(3N/4 - \varphi') && \lfloor N/2 \rfloor \le \varphi' < \lfloor 3N/4 \rfloor\\
&\cos(\varphi) = \text{sin\_table\_N}(\varphi' - 3N/4) && \lfloor 3N/4 \rfloor \le \varphi' < N,
\end{aligned}$$

where φ indicates the elevation information of the location information, or φ indicates the elevation information of the reference point corresponding to the elevation information of the location information, and sin_table_N( ) indicates the elevation trigonometric function table, and when M≠N, the trigonometric function value corresponding to the azimuth information of the location information meets the following formulas:

$$\begin{aligned}
&\sin(\theta) = \text{sin\_table\_M}(\theta') && \theta' < \lfloor M/4 \rfloor\\
&\sin(\theta) = \text{sin\_table\_M}(M/2 - \theta') && \lfloor M/4 \rfloor \le \theta' < \lfloor M/2 \rfloor\\
&\sin(\theta) = -\text{sin\_table\_M}(\theta' - M/2) && \lfloor M/2 \rfloor \le \theta' < \lfloor 3M/4 \rfloor\\
&\sin(\theta) = -\text{sin\_table\_M}(M - \theta') && \lfloor 3M/4 \rfloor \le \theta' < M
\end{aligned}$$

-continued $$\cos(\theta) = \text{sin\_table\_M}(M/4 - \theta') \quad \theta' < M/4$$

$$\cos(\theta) = -\text{sin\_table\_M}(\theta' - M/4) \quad \lfloor M/4 \rfloor \le \theta' < \lfloor M/2 \rfloor$$

$$\cos(\theta) = -\text{sin\_table\_M}(3M/4 - \theta') \quad \lfloor M/2 \rfloor \le \theta' < \lfloor 3M/4 \rfloor$$

$$\cos(\theta) = \text{sin\_table\_M}(\theta' - 3M/4) \quad \lfloor 3M/4 \rfloor \le \theta' < M,$$

where θ indicates the azimuth information of the location information, or θ indicates the azimuth information of the reference point corresponding to the azimuth information of the location information, and sin_table_M( ) indicates the azimuth trigonometric function table.

Alternatively, when M=N, the trigonometric function value corresponding to the elevation information of the location information meets the following formulas:

$$\sin(\varphi) = \text{sin\_table\_N}(\varphi') \quad \varphi' < \lfloor N/4 \rfloor$$

$$\sin(\varphi) = \text{sin\_table\_N}(N/2 - \varphi') \quad \lfloor N/4 \rfloor \le \varphi' < \lfloor N/2 \rfloor$$

$$\sin(\varphi) = -\text{sin\_table\_N}(\varphi' - N/2) \quad \lfloor N/2 \rfloor \le \varphi' < \lfloor 3N/4 \rfloor$$

$$\sin(\varphi) = -\text{sin\_table\_N}(N - \varphi') \quad \lfloor 3N/4 \rfloor \le \varphi' < N$$

$$\cos(\varphi) = \text{sin\_table\_N}(N/4 - \varphi') \quad \varphi' < N/4$$

$$\cos(\varphi) = -\text{sin\_table\_N}(\varphi' - N/4) \quad \lfloor N/4 \rfloor \le \varphi' < \lfloor N/2 \rfloor$$

$$\cos(\varphi) = -\text{sin\_table\_N}(3N/4 - \varphi') \quad \lfloor N/2 \rfloor \le \varphi' < \lfloor 3N/4 \rfloor$$

$$\cos(\varphi) = \text{sin\_table\_N}(\varphi' - 3N/4) \quad \lfloor 3N/4 \rfloor \le \varphi' < N,$$

where φ indicates the elevation information of the location information, or φ indicates the elevation information of the reference point corresponding to the elevation information of the location information, and sin_table_N( ) indicates the elevation trigonometric function table, and when M=N, the trigonometric function value corresponding to the azimuth information of the location information meets the following formulas:

$$\sin(\theta) = \text{sin\_table}(\theta') \quad \theta' < \lfloor N/4 \rfloor$$

$$\sin(\theta) = \text{sin\_table}(N/2 - \theta') \quad \lfloor N/4 \rfloor \le \theta' < \lfloor N/2 \rfloor$$

$$\sin(\theta) = -\text{sin\_table}(\theta' - N/2) \quad \lfloor N/2 \rfloor \le \theta' < \lfloor 3N/4 \rfloor$$

$$\sin(\theta) = -\text{sin\_table}(N - \theta') \quad \lfloor 3N/4 \rfloor \le \theta' < N$$

$$\cos(\theta) = \text{sin\_table}(N/4 - \theta') \quad \theta' < N/4$$

$$\cos(\theta) = -\text{sin\_table}(\theta' - N/4) \lfloor N/4 \rfloor \le \theta' < \lfloor N/2 \rfloor$$

$$\cos(\theta) = -\text{sin\_table}(3N/4 - \theta') \quad \lfloor N/2 \rfloor \le \theta' < \lfloor 3N/4 \rfloor$$

$$\cos(\theta) = \text{sin\_table}(\theta' - 3N/4) \lfloor 3N/4 \rfloor \le \theta' < N,$$

where θ indicates the azimuth information of the location information, or θ indicates the azimuth information of the reference point corresponding to the azimuth information of the location information, and sin_table_N( ) indicates the elevation trigonometric function table.

Alternatively, when M≠N, M=K1×N, and K1≥2, the trigonometric function value corresponding to the azimuth information of the location information meets the following formulas:

$$\sin(\theta) = \text{sin\_table\_M}(\theta') \quad \theta' < \lfloor M/4 \rfloor$$

$$\sin(\theta) = \text{sin\_table\_M}(M/2 - \theta') \quad \lfloor M/4 \rfloor \le \theta' < \lfloor M/2 \rfloor$$

$$\sin(\theta) = -\text{sin\_table\_M}(\theta' - M/2) \quad \lfloor M/2 \rfloor \le \theta' < \lfloor 3M/4 \rfloor$$

$$\sin(\theta) = -\text{sin\_table\_M}(M - \theta') \quad \lfloor 3M/4 \rfloor \le \theta' < M$$

$$\cos(\theta) = \text{sin\_table\_M}(M/4 - \theta') \quad \theta' < M/4$$

$$\cos(\theta) = -\text{sin\_table\_M}(\theta' - M/4) \quad \lfloor M/4 \rfloor \le \theta' < \lfloor M/2 \rfloor$$

$$\cos(\theta) = -\text{sin\_table\_M}(3M/4 - \theta') \quad \lfloor M/2 \rfloor \le \theta' < \lfloor 3M/4 \rfloor$$

$$\cos(\theta) = \text{sin\_table\_M}(\theta' - 3M/4) \quad \lfloor 3M/4 \rfloor \le \theta' < M,$$

where θ indicates the azimuth information of the location information, or θ indicates the azimuth information of the reference point corresponding to the azimuth information of the location information, and sin_table_M( ) indicates the azimuth trigonometric function table, and when M≠N, M=K1×N, and K1≥2, the trigonometric function value corresponding to the elevation information of the location information meets the following formulas:

$$\sin(\varphi) = \text{sin\_table\_M}(K2 \times \varphi') \quad K1 \times \varphi' < \lfloor M/4 \rfloor$$

$$\sin(\varphi) = \text{sin\_table\_M}(M/2 - K1 \times (\varphi') \quad \lfloor M/4 \rfloor \le K1 \times \varphi' < \lfloor M/2 \rfloor$$

$$\sin(\varphi) = -\text{sin\_table\_M}(K1 \times \varphi' - M/2) \quad \lfloor M/2 \rfloor \le K1 \times \varphi' < \lfloor 3M/4 \rfloor$$

$$\sin(\varphi) = -\text{sin\_table\_M}(M - K1 \times \varphi') \quad \lfloor 3M/4 \rfloor \le K1 \times \varphi' < M$$

$$\cos(\varphi) = \text{sin\_table\_N}(N/4 - K1 \times \varphi') \quad K1 \times \varphi' < \lfloor M/4 \rfloor$$

$$\cos(\varphi) = -\text{sin\_table\_M}(K1 \times \varphi' - M/4) \quad \lfloor M/4 \rfloor \le K1 \times \varphi' < \lfloor M/2 \rfloor$$

$$\cos(\varphi) = -\text{sin\_table\_M}(3M/4 - K1 \times \varphi') \quad \lfloor M/2 \rfloor \le K1 \times \varphi' < \lfloor 3M/4 \rfloor$$

$$\cos(\varphi) = \text{sin\_table\_M}(K1 \times \varphi' - 3M/4) \quad \lfloor 3M/4 \rfloor \le K1 \times \varphi' < M,$$

where φ indicates the elevation information of the location information, or φ indicates the elevation information of the reference point corresponding to the elevation information of the location information, and sin_table_M( ) indicates the azimuth trigonometric function table.

Alternatively, when M≠N, N=K2×M, and K2≥2, the trigonometric function value corresponding to the elevation information of the location information meets the following formulas:

$$\sin(\varphi) = \text{sin\_table\_N}(\varphi') \quad \varphi' < \lfloor N/4 \rfloor$$

$$\sin(\varphi) = \text{sin\_table\_N}(N/2 - \varphi') \quad \lfloor N/4 \rfloor \le \varphi' < \lfloor N/2 \rfloor$$

$$\sin(\varphi) = -\text{sin\_table\_N}(\varphi' - N/2) \quad \lfloor N/2 \rfloor \le \varphi' < \lfloor 3N/4 \rfloor$$

$$\sin(\varphi) = -\text{sin\_table\_N}(N - \varphi') \quad \lfloor 3N/4 \rfloor \le \varphi' < N$$

$$\cos(\varphi) = \text{sin\_table\_N}(N/4 - \varphi') \quad \varphi' < N/4$$

$$\cos(\varphi) = -\text{sin\_table\_N}(\varphi' - N/4) \quad \lfloor N/4 \rfloor \le \varphi' < \lfloor N/2 \rfloor$$

$$\cos(\varphi) = -\text{sin\_table\_N}(3N/4 - \varphi') \quad \lfloor N/2 \rfloor \le \varphi' < \lfloor 3N/4 \rfloor$$

$$\cos(\varphi) = \text{sin\_table\_N}(\varphi' - 3N/4) \quad \lfloor 3N/4 \rfloor \le \varphi' < N,$$

where φ indicates the elevation information of the location information, or φ indicates the elevation information of the reference point corresponding to the elevation information of the location information, and sin_table_N( ) indicates the elevation trigonometric function table, and when M≠N, N=K2×M, and K2≥2, the trigonometric function value corresponding to the azimuth information of the location information meets the following formulas:

$$
\begin{aligned}
&\sin(\theta) = \text{sin\_table\_N}(K2\times\theta') && K2\times\theta' < \lfloor N/4 \rfloor \\
&\sin(\theta) = \text{sin\_table\_N}(N/2 - K2\times(\theta') && \lfloor N/4 \rfloor \le K2\times\theta' < \lfloor N/2 \rfloor \\
&\sin(\theta) = -\text{sin\_table\_N}(K2\times\theta' - N/2) && \lfloor N/2 \rfloor \le K2\times\theta' < \lfloor 3N/4 \rfloor \\
&\sin(\theta) = -\text{sin\_table\_N}(N - K2\times\theta') && \lfloor 3N/4 \rfloor \le K2\times\theta' < N \\
&\cos(\theta) = \text{sin\_table\_N}(N/4 - K2\times\theta') && K2\times\theta' < \lfloor N/4 \rfloor \\
&\cos(\theta) = -\text{sin\_table\_N}(K2\times\theta' - N/4) && \lfloor N/4 \rfloor \le K2\times\theta' < \lfloor N/2 \rfloor \\
&\cos(\theta) = -\text{sin\_table\_N}(3N/4 - K2\times\theta') && \lfloor N/2 \rfloor \le K2\times\theta' < \lfloor 3N/4 \rfloor \\
&\cos(\theta) = \text{sin\_table\_N}(K2\times\theta' - 3N/4) && \lfloor 3N/4 \rfloor \le K2\times\theta' < N,
\end{aligned}
$$

where θ indicates the azimuth information of the location information, or θ indicates the azimuth information of the reference point corresponding to the azimuth information of the location information, and sin_table_N( ) indicates the elevation trigonometric function table.

Alternatively, when M≠N, the trigonometric function value corresponding to the elevation information of the location information meets the following formulas:

$$
\begin{aligned}
&\sin(\theta) = \text{cos\_table\_N}(N/4 - \theta') && \theta' < \lfloor N/4 \rfloor \\
&\sin(\theta) = \text{cos\_table\_N}(\theta' - N/4) && \lfloor N/4 \rfloor \le \theta' < \lfloor N/2 \rfloor \\
&\sin(\theta) = -\text{cos\_table\_N}(3N/4 - \theta') && \lfloor N/2 \rfloor \le \theta' < \lfloor 3N/4 \rfloor \\
&\sin(\theta) = -\text{cos\_table\_N}(\theta' - 3N/4) && \lfloor 3N/4 \rfloor \le \theta' < N \\
&\cos(\theta) = \text{cos\_table\_N}(\theta') && \theta' < \lfloor N/4 \rfloor \\
&\cos(\theta) = -\text{cos\_table\_N}(N/2 - \theta') && \lfloor N/4 \rfloor \le \theta' < \lfloor N/2 \rfloor \\
&\cos(\theta) = -\text{cos\_table\_N}(\theta' - N/2) && \lfloor N/2 \rfloor \le \theta' < \lfloor 3N/4 \rfloor \\
&\cos(\theta) = \text{cos\_table\_N}(N - \theta') && \lfloor 3N/4 \rfloor \le \theta' < N,
\end{aligned}
$$

where φ indicates the elevation information of the location information, or φ indicates the elevation information of the reference point corresponding to the elevation information of the location information, and cos_table_N( ) indicates the elevation trigonometric function table, and when M≠N, the trigonometric function value corresponding to the azimuth information of the location information meets the following formulas:

$$
\begin{aligned}
&\sin(\theta) = \text{cos\_table\_M}(M/4 - \theta') && \theta' < \lfloor M/4 \rfloor \\
&\sin(\theta) = \text{cos\_table\_M}(\theta' - M/4) && \lfloor M/4 \rfloor \le \theta' < \lfloor M/2 \rfloor \\
&\sin(\theta) = -\text{cos\_table\_M}(3M/4 - \theta') && \lfloor M/2 \rfloor \le \theta' < \lfloor 3M/4 \rfloor \\
&\sin(\theta) = -\text{cos\_table\_M}(\theta' - 3M/4) && \lfloor 3M/4 \rfloor \le \theta' < M \\
&\cos(\theta) = \text{cos\_table\_M}(\theta') && \theta' < \lfloor M/4 \rfloor \\
&\cos(\theta) = -\text{cos\_table\_M}(M/2 - \theta') && \lfloor M/4 \rfloor \le \theta' < \lfloor M/2 \rfloor \\
&\cos(\theta) = -\text{cos\_table\_M}(\theta' - M/2) && \lfloor M/2 \rfloor \le \theta' < \lfloor 3M/4 \rfloor \\
&\cos(\theta) = \text{cos\_table\_M}(M - \theta') && \lfloor 3M/4 \rfloor \le \theta' < M,
\end{aligned}
$$

where θ indicates the azimuth information of the location information, or θ indicates the azimuth information of the reference point corresponding to the azimuth information of the location information, and cos_table_M( ) indicates the azimuth trigonometric function table.

The apparatus in this embodiment may be configured to perform the technical solution in the method embodiment shown in FIG. 4. Implementation principles and technical effect thereof are similar. Details are not described herein again.

During implementation, the steps in the foregoing method embodiments may be performed by an integrated logic circuit of hardware in a processor or through instructions in a form of software. The processor may be a general-purpose processor, a digital signal processor (DSP), an application-specific integrated circuit (ASIC), a field-programmable gate array (FPGA) or another programmable logic device, a discrete gate or transistor logic device, or a discrete hardware component. The general-purpose processor may be a microprocessor, or the processor may be any conventional processor or the like. The steps of the methods disclosed in this disclosure may be directly performed by a hardware encoding processor, or may be performed by a combination of hardware and a software module in an encoding processor. The software module may be located in a mature storage medium in the art, such as a random-access memory (RAM), a flash memory, a read-only memory (ROM), a programmable ROM (PROM), an electrically erasable PROM (EEPROM), or a register. The storage medium is located in a memory, and a processor reads information in the memory and performs the steps in the foregoing methods based on hardware of the processor.

The memory mentioned in the foregoing embodiments may be a volatile memory or a non-volatile memory, or may include both a volatile memory and a non-volatile memory. The non-volatile memory may be a ROM, a PROM, an erasable PROM (EPROM), an EEPROM, or a flash memory. The volatile memory may be a RAM and serves as an external cache. By way of example but not limitative description, RAMs in many forms may be used, for example, a static RAM (SRAM), a dynamic RAM (DRAM), a synchronous DRAM (SDRAM), a double data rate (DDR) SDRAM, an enhanced SDRAM (ESDRAM), a synchronous link DRAM (SLDRAM), and a direct Rambus DR) RAM. It should be noted that the memory of the system and the method described in this specification includes but is not limited to these memories and any memory of another proper type.

A person of ordinary skill in the art may be aware that, in combination with examples described in embodiments disclosed in this specification, units and algorithm steps can be implemented by electronic hardware or a combination of computer software and electronic hardware. Whether the functions are performed by hardware or software depends on particular applications and design constraints of technical solutions. A person skilled in the art may use different methods to implement the described functions for each particular application, but it should not be considered that the implementation goes beyond the scope of this disclosure.

A person skilled in the art can clearly understand that, for ease and brevity of description, for a detailed operating process of the foregoing system, apparatus, and unit, reference may be made to a corresponding process in the foregoing method embodiments, and details are not described herein again.

In several embodiments provided in this disclosure, it should be understood that the disclosed system, apparatus, and method may be implemented in other manners. For example, the described apparatus embodiment is merely an example. For example, division into the units is merely logical function division and may be other division during actual implementation. For example, a plurality of units or components may be combined or integrated into another system, or some features may be ignored or not performed. In addition, the shown or discussed mutual couplings or direct couplings or communication connections may be implemented through some interfaces. The indirect couplings or communication connections between the apparatuses or units may be implemented in electrical, mechanical, or other forms.

The units described as separate parts may or may not be physically separate, and parts shown as units may or may not be physical units, that is, may be located in one place, or may be distributed on a plurality of network units. Some or all of the units may be selected according to actual requirements to achieve objectives of solutions of embodiments.

In addition, functional units in embodiments of this disclosure may be integrated into one processing unit, each of the units may exist alone physically, or two or more units may be integrated into one unit.

When the functions are implemented in a form of a software functional unit and sold or used as an independent product, the functions may be stored in a computer-readable storage medium. Based on such an understanding, technical solutions of this disclosure essentially, or a part contributing to the conventional technology, or some of technical solutions may be implemented in a form of a software product. The computer software product is stored in a storage medium, and includes several instructions for instructing a computer device (a personal computer, a server, a network device, or the like) to perform all or some of the steps of the methods described in embodiments of this disclosure. The storage medium includes any medium that can store program code, for example, a Universal Serial Bus (USB) flash drive, a removable hard disk, a ROM, a RAM, a magnetic disk, or an optical disc.

The foregoing descriptions are merely specific implementations of this disclosure, but are not intended to limit the protection scope of this disclosure. Any variation or replacement readily figured out by a person skilled in the art within the technical scope disclosed in this disclosure shall fall within the protection scope of this disclosure. Therefore, the protection scope of this disclosure shall be subject to the protection scope of the claims.

What is claimed is:

1. A method comprising:

obtaining location information of a virtual speaker on a preset spherical surface of a spherical space, wherein the location information comprises elevation information, azimuth information, or both the elevation information and the azimuth information, wherein the elevation information comprises an elevation of the location information or an elevation index of the location information, wherein the elevation is φ, wherein the elevation index is φ', wherein φ and φ' have a relationship defined by the following formula: φ'=round (φ/(2π$r_i$×N)), wherein $r_j$ indicates a radius of the first circle of longitude, wherein $r_j$ is equal to the radius of the spherical space, wherein round( ) indicates rounding, wherein the preset spherical surface comprises M circles of longitude and N circles of latitude, wherein radii of the M circles of longitude are equal to a radius of the spherical space, wherein the M circles and the N circles intersect at reference points, wherein the reference points comprise first reference points on a first circle of the M circles and comprise second reference points on a second circle of the N circles, wherein a first quantity of the first reference points is greater than or equal to $\lfloor N/4 \rfloor+1$, wherein $\lfloor\ \rfloor$ indicates rounding down, and wherein a second quantity of the second references points is greater than or equal to $\lfloor M/4 \rfloor+1$;

obtaining, based on the location information and a preset reference trigonometric function table, a first trigonometric function value corresponding to the location information, wherein the preset reference trigonometric function table comprises an elevation trigonometric function table, an azimuth trigonometric function table, or both the elevation trigonometric function table and the azimuth trigonometric function table, wherein the elevation trigonometric function table comprises a plurality of second trigonometric function values corresponding to elevation indexes of the first reference points, and wherein the azimuth trigonometric function table comprises a plurality of third trigonometric function values corresponding to azimuth indexes of the second reference points; and obtaining, based on the first trigonometric function value, a higher-order ambisonics (HOA) coefficient for the virtual speaker, wherein a calculation formula for a 16-channel higher-order ambisonics (HOA) coefficient corresponding to a 3rd-order HOA signal comprises:

TABLE 1

| m | n | Expression of HOA coefficient in polar coordinates |
|---|---|---|
| 0 | 0 | $\frac{1}{2\sqrt{\pi}}$ |
| 1 | 0 | $\frac{1}{2}\sqrt{\frac{3}{\pi}}\cos\theta$ |
| | +1 | $\frac{1}{2}\sqrt{\frac{3}{\pi}}\sin\theta\cos\varphi$ |
| | −1 | $\frac{1}{2}\sqrt{\frac{3}{\pi}}\sin\theta\sin\varphi$ |
| 2 | 0 | $\frac{1}{4}\sqrt{\frac{5}{\pi}}(3\cos^2\theta-1)$ |
| | +1 | $\frac{1}{2}\sqrt{\frac{15}{\pi}}\sin\theta\cos\theta\cos\varphi$ |
| | −1 | $\frac{1}{2}\sqrt{\frac{15}{\pi}}\sin\theta\cos\theta\sin\varphi$ |
| | +2 | $\frac{1}{4}\sqrt{\frac{15}{\pi}}\sin^2\theta\cos 2\varphi$ |
| | −2 | $\frac{1}{4}\sqrt{\frac{15}{\pi}}\sin^2\theta\sin 2\varphi$ |
| 3 | 0 | $\frac{1}{4}\sqrt{\frac{7}{\pi}}(5\cos^3\theta-3\cos\theta)$ |
| | +1 | $\frac{1}{4}\sqrt{\frac{21}{2\pi}}(5\cos^2\theta-1)\sin\theta\cos\varphi$ |
| | −1 | $\frac{1}{4}\sqrt{\frac{21}{2\pi}}(5\cos^2\theta-1)\sin\theta\sin\varphi$ |

TABLE 1-continued

| m | n | Expression of HOA coefficient in polar coordinates |
|---|---|---|
| | +2 | $\frac{1}{4}\sqrt{\frac{105}{\pi}}\cos\theta\sin^2\theta\cos 2\varphi$ |
| | −2 | $\frac{1}{4}\sqrt{\frac{105}{\pi}}\cos\theta\sin^2\theta\sin 2\varphi$ |
| | +3 | $\frac{1}{4}\sqrt{\frac{35}{\pi}}\sin^3\theta\cos 3\varphi$ |
| | −3 | $\frac{1}{4}\sqrt{\frac{35}{\pi}}\sin^3\theta\sin 3\varphi$ |

wherein θ indicates the azimuth information, wherein φ indicates the elevation information, wherein m indicates a sequence number of an HOA order, and wherein n indicates a direction parameter at each order.

2. The method of claim 1, wherein the second trigonometric function values are sine function values or cosine function values, wherein when the second trigonometric function values are sine function values, a sine function value corresponding to an $i^{th}$ elevation index in the elevation trigonometric function table is obtained using formula (1), wherein the formula (1) is:

$$\text{sin\_table\_N}(i) = \sin\big((\pi \text{r\_i})/(2N^{\wedge\prime}) \times i\big),$$

wherein when the second trigonometric function values are cosine function values, a cosine function value corresponding to an $i^{th}$ elevation index in the elevation trigonometric function table is obtained using formula (2), wherein the formula (2) is:

$$\text{cos\_table\_N}(i) = \cos\big((\pi \text{r\_i})/(2N^{\wedge\prime}) \times i\big),$$

wherein i=0, 1, . . . , and N', wherein N'=⌊N/4⌋, and wherein $r_i$ indicates a radius of the first circle of longitude.

3. The method of claim 1, wherein the third trigonometric function values are sine function values or cosine function values, wherein when the third trigonometric function values are sine function values, a sine function value corresponding to an $i^{th}$ azimuth index in the azimuth trigonometric function table is obtained using formula (1), wherein the formula (1) is:

$$\text{sin\_table\_M}(j) = \sin\big((\pi \text{r\_j})/(2M^{\wedge\prime}) \times j\big),$$

wherein when the third trigonometric function values are cosine function values, a cosine function value corresponding to an $i^{th}$ azimuth index in the azimuth trigonometric function table is obtained using formula (2), wherein the formula (2) is:

$$\text{cos\_table\_M}(j) = \cos\big((\pi \text{r\_j})/(2M^{\wedge\prime}) \times j\big),$$

wherein j=0, 1, . . . , and M', wherein M'=⌊M/4⌋, wherein $r_j$ indicates a radius of the first circle of latitude, and wherein when the first circle of latitude is the equator of the spherical space, $r_j$ is equal to the radius of the spherical space.

4. The method of claim 1, further comprising obtaining, based on the elevation information and the elevation trigonometric function table, a fourth trigonometric function value corresponding to the elevation information.

5. The method of claim 4, wherein the azimuth information comprises an azimuth of the location information or an azimuth index of the location information.

6. The method of claim 5, wherein the azimuth is θ and the azimuth index is θ', wherein θ and θ' have a relationship defined by the following formula:

$$\theta' = \text{round}\left(\frac{\theta}{2\pi r_j \times M}\right),$$

wherein $r_j$ indicates a radius of the first circle of latitude, wherein when the first circle of latitude is the equator of the spherical space, $r_j$ is equal to the radius of the spherical space, and wherein round( ) indicates rounding.

7. The method of claim 1, wherein when M=N, the fourth trigonometric function value in the elevation trigonometric function table is obtained by using one of the following formulas:

$$\begin{aligned}
&\sin(\varphi) = \text{sin\_table}(\varphi') && \varphi' < \lfloor N/4 \rfloor \\
&\sin(\varphi) = \text{sin\_table}(N/2 - \varphi') && \lfloor N/4 \rfloor \le \varphi' < \lfloor N/2 \rfloor \\
&\sin(\varphi) = -\text{sin\_table}(\varphi' - N/2) && \lfloor N/2 \rfloor \le \varphi' < \lfloor 3N/4 \rfloor \\
&\sin(\varphi) = -\text{sin\_table}(N - \varphi') && \lfloor 3N/4 \rfloor \le \varphi' < N \\
&\cos(\varphi) = \text{sin\_table}(N/4 - \varphi') && \varphi' < N/4 \\
&\cos(\varphi) = -\text{sin\_table}(\varphi' - N/4) && \lfloor N/4 \rfloor \le \varphi' < \lfloor N/2 \rfloor \\
&\cos(\varphi) = -\text{sin\_table}(3N/4 - \varphi') && \lfloor N/2 \rfloor \le \varphi' < \lfloor 3N/4 \rfloor \\
&\cos(\varphi) = \text{sin\_table}(\varphi' - 3N/4) && \lfloor 3N/4 \rfloor \le \varphi' < N,
\end{aligned}$$

wherein φ indicates the elevation information or second elevation information of a reference point corresponding to the elevation information, and wherein sin_table_N( ) indicates the elevation trigonometric function table, and wherein when M=N, the fifth trigonometric function value in the azimuth trigonometric function table is obtained using one of the following formulas:

$$\sin(\theta) = \text{sin\_table}(\theta')$$

$$\theta' < \lfloor N/4 \rfloor$$

$$\sin(\theta) = \text{sin\_table}(N/2 - \theta')$$

$$\lfloor N/4 \rfloor \le \theta' < \lfloor N/2 \rfloor$$

$$\sin(\theta) = -\text{sin\_table}(\theta' - N/2)$$

$$\lfloor N/2 \rfloor \le \theta' < \lfloor 3N/4 \rfloor$$

-continued $$\sin(\theta) = -\text{sin\_table}(N - \theta')$$

$$\lfloor 3N/4 \rfloor \le \theta' < N$$

$$\cos(\theta) = \text{sin\_table}(N/4 - \theta')$$

$$\theta' < \lfloor N/4 \rfloor$$

$$\cos(\theta) = -\text{sin\_table}(\theta' - N/4)$$

$$\lfloor N/4 \rfloor \le \theta' < \lfloor N/2 \rfloor$$

$$\cos(\theta) = -\text{sin\_table}(3N/4 - \theta')$$

$$\lfloor N/2 \rfloor \le \theta' < \lfloor 3N/4 \rfloor$$

$$\cos(\theta) = \text{sin\_table}(\theta' - 3N/4)$$

$$\lfloor 3N/4 \rfloor \le \theta' < N.$$

8. An audio processing device comprising:

a memory configured to store instructions; and one or more processors coupled to the memory and configured to execute the instructions to cause the audio processing device to:

obtain location information of a virtual speaker on a preset spherical surface of a spherical space, wherein the location information comprises elevation information or azimuth information, wherein the elevation information comprises an elevation of the location information or an elevation index of the location information, wherein the elevation is φ, wherein the elevation index is φ', wherein φ and φ' have a relationship defined by the following formula: $\varphi'=\text{round}(\varphi/(2\pi r_i \times N))$, wherein $r_i$ indicates a radius of the first circle of longitude, wherein $r_j$ is equal to the radius of the spherical space, wherein round( ) indicates rounding, wherein the preset spherical surface comprises M circles of longitude and N circles of latitude, wherein radii of the M circles of longitude are equal to a radius of the spherical space, wherein the M circles and the N circles intersect at reference points, wherein the reference points comprise first reference points on a first circle of the M circles and comprise second reference points on a second circle of the N circles, wherein a first quantity of the first reference points is greater than or equal to $\lfloor N/4 \rfloor+1$, wherein $\lfloor\ \rfloor$ indicates rounding down, and wherein a second quantity of the second references points is greater than or equal to $\lfloor M/4 \rfloor+1$;

obtain, based on the location information and a preset reference trigonometric function table, a first trigonometric function value corresponding to the location information, wherein the preset reference trigonometric function table comprises an elevation trigonometric function table, an azimuth trigonometric function table, or both the elevation trigonometric function table and the azimuth trigonometric function table, wherein the elevation trigonometric function table comprises a plurality of second trigonometric function values corresponding to elevation indexes of a plurality of first reference points, and the azimuth trigonometric function table comprises a plurality of third trigonometric function values corresponding to azimuth indexes of a plurality of second reference points; and obtain, based on the first trigonometric function value, a higher order ambisonics (HOA) coefficient for the virtual speaker, wherein a calculation formula for a 16-channel higher-order ambisonics (HOA) coefficient corresponding to a $3^{rd}$-order HOA signal comprises:

| m | n | Expression of HOA coefficient in polar coordinates |
|---|---|---|
| 0 | 0 | $\frac{1}{2\sqrt{\pi}}$ |
| 1 | 0 | $\frac{1}{2}\sqrt{\frac{3}{\pi}}\cos\theta$ |
| | +1 | $\frac{1}{2}\sqrt{\frac{3}{\pi}}\sin\theta\cos\varphi$ |
| | −1 | $\frac{1}{2}\sqrt{\frac{3}{\pi}}\sin\theta\sin\varphi$ |
| 2 | 0 | $\frac{1}{4}\sqrt{\frac{5}{\pi}}(3\cos^2\theta - 1)$ |
| | +1 | $\frac{1}{2}\sqrt{\frac{15}{\pi}}\sin\theta\cos\theta\cos\varphi$ |
| | −1 | $\frac{1}{2}\sqrt{\frac{15}{\pi}}\sin\theta\cos\theta\sin\varphi$ |
| | +2 | $\frac{1}{4}\sqrt{\frac{15}{\pi}}\sin^2\theta\cos 2\varphi$ |
| | −2 | $\frac{1}{4}\sqrt{\frac{15}{\pi}}\sin^2\theta\sin 2\varphi$ |
| 3 | 0 | $\frac{1}{4}\sqrt{\frac{7}{\pi}}(5\cos^3\theta - 3\cos\theta)$ |
| | +1 | $\frac{1}{4}\sqrt{\frac{21}{2\pi}}(5\cos^2\theta - 1)\sin\theta\cos\varphi$ |
| | −1 | $\frac{1}{4}\sqrt{\frac{21}{2\pi}}(5\cos^2\theta - 1)\sin\theta\sin\varphi$ |
| | +2 | $\frac{1}{4}\sqrt{\frac{105}{\pi}}\cos\theta\sin^2\theta\cos 2\varphi$ |
| | −2 | $\frac{1}{4}\sqrt{\frac{105}{\pi}}\cos\theta\sin^2\theta\sin 2\varphi$ |
| | +3 | $\frac{1}{4}\sqrt{\frac{35}{2\pi}}\sin^3\theta\cos 3\varphi$ |
| | −3 | $\frac{1}{4}\sqrt{\frac{35}{2\pi}}\sin^3\theta\sin 3\varphi$ |

wherein θ indicates the azimuth information, wherein φ indicates the elevation information, wherein m indicates a sequence number of an HOA order, and wherein n indicates a direction parameter at each order.

9. The audio processing device of claim 8, wherein the second trigonometric function values are sine function values or cosine function values, wherein when the second trigonometric function values are sine function values, a sine function value corresponding to an $i^{th}$ elevation index in the elevation trigonometric function table is obtained using formula (1), wherein the formula (1) is:

$$\text{sin\_table\_N}(i)=\sin\left((\pi \text{r\_i})/(2N^{\wedge\prime})\times i\right),$$

wherein when the second trigonometric function values are cosine function values, a cosine function value corresponding to an $i^{th}$ elevation index in the elevation trigonometric function table is obtained using formula (2), wherein the formula (2) is:

$$\text{cos\_table\_N}(i)=\cos\left((\pi \text{r\_i})/(2N^{\wedge\prime})\times i\right),$$

wherein i=0, 1, . . . , and N', wherein $N'=\lfloor N/4\rfloor$, and wherein $r_i$ indicates a radius of the first circle of longitude.

10. The audio processing device of claim 8, wherein the third trigonometric function values are sine function values or cosine function values, wherein when the third trigonometric function values are sine function values, a sine function value corresponding to an $i^{th}$ azimuth index in the azimuth trigonometric function table is obtained using formula (1), wherein the formula (1) is:

$$\text{sin\_table\_M}(j)=\sin\left((\pi \text{r\_j})/(2M^{\wedge\prime})\times j\right),$$

wherein when the third trigonometric function values are cosine function values, a cosine function value corresponding to an $i^{th}$ azimuth index in the azimuth trigonometric function table is obtained using formula (2), wherein the formula (2) is:

$$\text{cos\_table\_M}(j)=\cos\left((\pi \text{r\_j})/(2M^{\wedge\prime})\times j\right),$$

wherein j=0, 1, . . . , and M', wherein $M'=\lfloor M/4\rfloor$, wherein $r_j$ indicates a radius of the first circle of latitude, and wherein when the first circle of latitude is the equator of the spherical space, $r_j$ is equal to the radius of the spherical space.

11. The audio processing device of claim 8, wherein the one or more processors are further configured to execute the instructions to cause the audio processing device to:

obtain, based on the azimuth information and the azimuth trigonometric function table, a fifth trigonometric function value corresponding to the azimuth information; or obtain, based on the elevation information and the elevation trigonometric function table, a fourth trigonometric function value corresponding to the elevation information, and obtaining, based on the azimuth information and the azimuth trigonometric function table, the fifth trigonometric function value corresponding to the azimuth information.

12. The audio processing device of claim 11, wherein the azimuth information comprises an azimuth of the location information or an azimuth index of the location information.

13. The audio processing device of claim 12, wherein the azimuth is θ and the azimuth index is θ', wherein θ and θ' have a relationship defined by the following formula:

$$\theta'=\text{round}\left(\frac{\theta}{2\pi r_j\times M}\right),$$

wherein $r_j$ indicates a radius of the first circle of latitude, wherein when the first circle of latitude is the equator of the spherical space, $r_j$ is equal to the radius of the spherical space, and wherein round( ) indicates rounding.

14. The audio processing device of claim 8, wherein when M=N, the fourth trigonometric function value in the elevation trigonometric function table is obtained by using one of the following formulas:

$$\sin(\varphi)=\text{sin\_table}(\varphi')$$
$$\varphi'<\lfloor N/4\rfloor$$
$$\sin(\varphi)=\text{sin\_table}(N/2-\varphi')$$
$$\lfloor N/4\rfloor\le\varphi'<\lfloor N/2\rfloor$$
$$\sin(\varphi)=-\text{sin\_table}(\varphi'-N/2)$$
$$\lfloor N/2\rfloor\le\varphi'<\lfloor 3N/4\rfloor$$
$$\sin(\varphi)=-\text{sin\_table}(N-\varphi')$$
$$\lfloor 3N/4\rfloor\le\varphi'<N$$
$$\cos(\varphi)=\text{sin\_table}(N/4-\varphi')$$
$$\varphi'<\lfloor N/4\rfloor$$
$$\cos(\varphi)=-\text{sin\_table}(\varphi'-N/4)$$
$$\lfloor N/4\rfloor\le\varphi'<\lfloor N/2\rfloor$$
$$\cos(\varphi)=-\text{sin\_table}(3N/4-\varphi')$$
$$\lfloor N/2\rfloor\le\varphi'<\lfloor 3N/4\rfloor$$
$$\cos(\varphi)=\text{sin\_table}(\varphi'-3N/4)$$
$$\lfloor 3N/4\rfloor\le\varphi'<N,$$

wherein φ indicates the elevation information or second elevation information of a reference point corresponding to the elevation information, and wherein sin_table_N( ) indicates the elevation trigonometric function table, and wherein when M=N, the fifth trigonometric function value in the azimuth trigonometric function table is obtained using one of the following formulas:

$$\sin(\theta)=\text{sin\_table}(\theta')$$
$$\theta'<\lfloor N/4\rfloor$$
$$\sin(\theta)=\text{sin\_table}(N/2-\theta')$$
$$\lfloor N/4\rfloor\le\theta'<\lfloor N/2\rfloor$$
$$\sin(\theta)=-\text{sin\_table}(\theta'-N/2)$$
$$\lfloor N/2\rfloor\le\theta'<\lfloor 3N/4\rfloor$$
$$\sin(\theta)=-\text{sin\_table}(N-\theta')$$
$$\lfloor 3N/4\rfloor\le\theta'<N$$
$$\cos(\theta)=\text{sin\_table}(N/4-\theta')$$
$$\theta'<\lfloor N/4\rfloor$$
$$\cos(\theta)=-\text{sin\_table}(\theta'-N/4)$$
$$\lfloor N/4\rfloor\le\theta'<\lfloor N/2\rfloor$$

-continued $$\cos(\theta) = -\text{sin\_table}(3N/4 - \theta')$$

$$\lfloor N/2 \rfloor \le \theta' < \lfloor 3N/4 \rfloor$$

$$\cos(\theta) = \text{sin\_table}(\theta' - 3N/4)$$

$$\lfloor 3N/4 \rfloor \le \theta' < N.$$

15. A non-transitory computer-readable storage medium comprising computer-executable instructions that, when executed by a processor, cause an audio processing device to:

obtain location information of a virtual speaker on a preset spherical surface of a spherical space, wherein the location information comprises elevation information, azimuth information, or both the elevation information and the azimuth information, wherein the elevation information comprises an elevation of the location information or an elevation index of the location information, wherein the elevation is φ, wherein the elevation index is φ', wherein φ and φ' have a relationship defined by the following formula: φ'=round(φ/(2πr$_i$×N)), wherein $r_i$ indicates a radius of the first circle of longitude, wherein $r_j$ is equal to the radius of the spherical space, wherein round( ) indicates rounding, wherein the preset spherical surface comprises M circles of longitude and N circles of latitude, wherein radii of the M circles of longitude are equal to a radius of the spherical space, and wherein the M circles and the N circles intersect at reference points, wherein the reference points comprise first reference points on a first circle of the M circles and comprise second reference points on a second circle of the N circles, wherein a first quantity of the first reference points is greater than or equal to ⌊N/4⌋+1, wherein ⌊ ⌋ indicates rounding down, and wherein a second quantity of the second references points is greater than or equal to ⌊M/4⌋+1;

obtain, based on the location information and a preset reference trigonometric function table, a first trigonometric function value corresponding to the location information, wherein the preset reference trigonometric function table comprises an elevation trigonometric function table, an azimuth trigonometric function table, or both the elevation trigonometric function table and the azimuth trigonometric function table, wherein the elevation trigonometric function table comprises a plurality of second trigonometric function values corresponding to elevation indexes of a plurality of first reference points, and wherein the azimuth trigonometric function table comprises a plurality of third trigonometric function values corresponding to azimuth indexes of a plurality of second reference points, wherein the second reference points are on a first circle of latitude; and obtain, based on the first trigonometric function value, a higher order ambisonics (HOA) coefficient for the virtual speaker, wherein a calculation formula for a 16-channel higher-order ambisonics (HOA) coefficient corresponding to a 3$^{rd}$-order HOA signal comprises:

TABLE 1

| m | n | Expression of HOA coefficient in polar coordinates |
|---|---|---|
| 0 | 0 | $\frac{1}{2\sqrt{\pi}}$ |
| 1 | 0 | $\frac{1}{2}\sqrt{\frac{3}{\pi}}\cos\theta$ |
| | +1 | $\frac{1}{2}\sqrt{\frac{3}{\pi}}\sin\theta\cos\varphi$ |
| | −1 | $\frac{1}{2}\sqrt{\frac{3}{\pi}}\sin\theta\sin\varphi$ |
| 2 | 0 | $\frac{1}{4}\sqrt{\frac{5}{\pi}}(3\cos^2\theta - 1)$ |
| | +1 | $\frac{1}{2}\sqrt{\frac{15}{\pi}}\sin\theta\cos\theta\cos\varphi$ |
| | −1 | $\frac{1}{2}\sqrt{\frac{15}{\pi}}\sin\theta\cos\theta\sin\varphi$ |
| | +2 | $\frac{1}{4}\sqrt{\frac{15}{\pi}}\sin^2\theta\cos 2\varphi$ |
| | −2 | $\frac{1}{4}\sqrt{\frac{15}{\pi}}\sin^2\theta\sin 2\varphi$ |
| 3 | 0 | $\frac{1}{4}\sqrt{\frac{7}{\pi}}(5\cos^3\theta - 3\cos\theta)$ |
| | +1 | $\frac{1}{4}\sqrt{\frac{21}{2\pi}}(5\cos^2\theta - 1)\sin\theta\cos\varphi$ |
| | −1 | $\frac{1}{4}\sqrt{\frac{21}{2\pi}}(5\cos^2\theta - 1)\sin\theta\sin\varphi$ |
| | +2 | $\frac{1}{4}\sqrt{\frac{105}{\pi}}\cos\theta\sin^2\theta\cos 2\varphi$ |
| | −2 | $\frac{1}{4}\sqrt{\frac{105}{\pi}}\cos\theta\sin^2\theta\sin 2\varphi$ |
| | +3 | $\frac{1}{4}\sqrt{\frac{35}{\pi}}\sin^3\theta\cos 3\varphi$ |
| | −3 | $\frac{1}{4}\sqrt{\frac{35}{\pi}}\sin^3\theta\sin 3\varphi$ |

wherein θ indicates the azimuth information, wherein φ indicates the elevation information, wherein m indicates a sequence number of an HOA order, and wherein n indicates a direction parameter at each order.

16. The non-transitory computer-readable storage medium of claim 15, wherein the second trigonometric function values are sine function values or cosine function values, wherein when the second trigonometric function values are sine function values, a sine function value corresponding to an i$^{th}$ elevation index in the elevation trigonometric function table is obtained using formula (1), wherein the formula (1) is:

$$\text{sin\_table\_N}(i) = \sin((\pi \text{r\_i})/(2N^{\wedge\prime}) \times i),$$

wherein when the second trigonometric function values are cosine function values, a cosine function value corresponding to an $i^{th}$ elevation index in the elevation trigonometric function table is obtained using formula (2), wherein the formula (2) is:

$$cos\_table\_N(i) = \cos((\pi r\_i)/(2N^{\wedge\prime}) \times i),$$

wherein i=0, 1, . . . , and N', wherein N'=⌊N/4⌋, and wherein $r_i$ indicates a radius of the first circle of longitude.

17. The non-transitory computer-readable storage medium of claim 15, wherein the third trigonometric function values are sine function values or cosine function values, wherein when the third trigonometric function values are sine function values, a sine function value corresponding to an $i^{th}$ azimuth index in the azimuth trigonometric function table is obtained using formula (1), wherein the formula (1) is:

$$sin\_table\_M(j) = \sin((\pi r\_j)/(2M^{\wedge\prime}) \times j),$$

wherein when the third trigonometric function values are cosine function values, a cosine function value corresponding to an $i^{th}$ azimuth index in the azimuth trigonometric function table is obtained using formula (2), wherein the formula (2) is:

$$cos\_table\_M(j) = \cos((\pi r\_j)/(2M^{\wedge\prime}) \times j),$$

wherein j=0, 1, . . . , and M', wherein M'=⌊M/4⌋, wherein $r_j$ indicates a radius of the first circle of latitude, and wherein when the first circle of latitude is the equator of the spherical space, $r_j$ is equal to the radius of the spherical space.

18. The method of claim 1, wherein the preset reference trigonometric function table is calculated and stored for a current audio frame, wherein when a value of M of the current audio frame equals a value of M of a previous audio frame, the azimuth trigonometric function table is obtained from the previous audio frame without recalculation, and wherein when a value of N of the current audio frame equals a value of N of the previous audio frame, the elevation trigonometric function table is obtained from the previous audio frame without recalculation.

19. The method of claim 1, wherein M and N have a multiple relationship where M=K1×N and K1≥2, and wherein trigonometric function values corresponding to the elevation information are obtained based on the azimuth trigonometric function table using the conversion factor K1.

20. The method of claim 1, wherein M×N≥K, and wherein K is a total quantity of virtual speakers in a virtual speaker set equal to 2048.

* * * * *